(12) United States Patent
Yerramalli et al.

(10) Patent No.: US 12,418,377 B2
(45) Date of Patent: Sep. 16, 2025

(54) SUPPORTING SCHEDULING OF SOUNDING REFERENCE SIGNALS

(71) Applicant: QUALCOMM Incorporated, San Diego, CA (US)

(72) Inventors: Srinivas Yerramalli, San Diego, CA (US); Mukesh Kumar, Hyderabad (IN); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 17/920,318

(22) PCT Filed: Jun. 7, 2021

(86) PCT No.: PCT/US2021/036206
§ 371 (c)(1),
(2) Date: Oct. 20, 2022

(87) PCT Pub. No.: WO2022/005705
PCT Pub. Date: Jan. 6, 2022

(65) Prior Publication Data
US 2023/0179366 A1  Jun. 8, 2023

(30) Foreign Application Priority Data
Jun. 30, 2020  (IN) .............................. 202041027732

(51) Int. Cl.
*H04L 12/26* (2006.01)
*H04L 5/00* (2006.01)
*H04W 72/12* (2023.01)

(52) U.S. Cl.
CPC ........... *H04L 5/0051* (2013.01); *H04W 72/12* (2013.01)

(58) Field of Classification Search
None
See application file for complete search history.

(56) References Cited

U.S. PATENT DOCUMENTS 10,462,676 B2    10/2019  Mallik et al.
10,498,556 B2 *  12/2019  Jöngren ............... H04L 5/0032
2018/0359781 A1  12/2018  Yoon et al.

FOREIGN PATENT DOCUMENTS

EP    3860241 A1      8/2021
KR    20180134733 A  12/2018
(Continued)

OTHER PUBLICATIONS

CMCC: "Discussions on UL SRS for Positioning Collision Rules", 3GPP TSG RAN WG1 #100, 3GPP Draft, R1-2000761, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, 3 Pages, Feb. 14, 2020 (Feb. 14, 2020), XP051853043, Sections 2-3.
(Continued)

*Primary Examiner* — Zewdu A Beyen
(74) *Attorney, Agent, or Firm* — Procopio, Cory, Hargreaves & Savitch LLP

(57) ABSTRACT

A user equipment (UE) receives scheduling information for Sounding Reference Signal (SRS) for positioning that includes multiple reserved occasions to transmit the SRS. The multiple reserved occasions may be used on all or on only a subset of configured SRS resources. The UE transmits the positioning SRS on a reserved occasion that is first available for transmission, e.g., without collision or other restrictions of transmission of the SRS. The UE does not transmit the positioning SRS on any earlier reserved occasions that is not available or any subsequent reserved occasions. The base station may attempt to decode the SRS on each reserved occasion until the positioning SRS is
(Continued)

transmitted. The base station may reassign unused reserved occasions to other UEs or to other channels. The base station may report positioning measurements with associated time stamps for the reserved occasion on which the positioning SRS was received.

17 Claims, 11 Drawing Sheets

(56) References Cited

FOREIGN PATENT DOCUMENTS

| WO | WO-2011050856 A1 * | 5/2011 | ............ H04L 5/0048 |
|---|---|---|---|
| WO | 2018190977 A1 | 10/2018 | |
| WO | WO-2020035153 A1 * | 2/2020 | ............ G01S 5/0063 |
| WO | 2020066103 A1 | 4/2020 | |

OTHER PUBLICATIONS

Fraunhofer IIS, et al., "SRS Enhancements for NR Positioning", 3GPP Draft, 3GPP TSG RAN WG1 Meeting #96, R1-1905484_SRS Enhancements for NR Positioning, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 2, 2019 (Apr. 2, 2019), XP051707552, 14 Pages, Sections 2.2 and 2.3, Figures 4-5, Figure 2 Section 2.1.

International Search Report and Written Opinion—PCT/US2021/036206—ISA/EPO—Sep. 24, 2021.

OPPO: "Discussion on UL Reference Signals for NR Positioning", 3GPP Draft, R1-1910122, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, 6 Pages, Oct. 4, 2019 (Oct. 4, 2019), KP051808076, Section 2.3.

Qualcomm Incorporated: "On UE Rx-Tx Timing Difference Measurements in NR Positioning", 3GPP TSG-RAN WG4 Meeting #95-e, 3GPP Draft, R4-2006170, 3rd Generation Partnership Project (3GPP), Mobile Competence Centre, 650, Route Des Lucioles, F-06921 Sophia-Antipolis Cedex, France, vol. RAN WG4, No. Online, May 25, 2020-Jun. 5, 2020, 8 Pages, May 15, 2020 (May 15, 2020), XP051883294, Section 5, figure.

Qualcomm Incorporated: "UL Reference Signals for NR Positioning", 3GPP TSG RAN WG1 #98, R1-1909279, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, XP051765884, 6 Pages, p. 1, paragraph 3 p. 3, paragraph 4 figure 3, Section 4, p. 3, p. 4, line 42-line 45, p. 5, line 1-line 2, p. 5, line 16-line 18, figure 3.

Huawei, et al., "SRS Design for NR Positioning," 3GPP TSG RAN WG1 Meeting #98bis, R1-1910034, Oct. 14, 2019-Oct. 20, 2019, Oct. 5, 2019, 20 pages, The whole document.

* cited by examiner

SUPPORTING SCHEDULING OF SOUNDING REFERENCE SIGNALS

CROSS REFERENCE TO RELATED APPLICATION(S)

This application is a National Stage Application filed under 35 U.S.C. § 371 of PCT International Application No. PCT/US2021/036206, entitled "METHOD AND APPARATUS FOR SUPPORTING SCHEDULING OF SOUNDING REFERENCE SIGNALS" filed Jun. 7, 2021, which claims priority to India application No. 202041027732, filed Jun. 30, 2020, entitled "METHODS AND APPARATUS FOR SUPPORTING SCHEDULING OF SOUNDING REFERENCE SIGNALS," which are incorporated herein by reference in their entirety.

BACKGROUND OF THE DISCLOSURE

1. Field of the Disclosure

Aspects of the disclosure relate generally to positioning for user equipment (UE).

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

A user equipment (UE) receives scheduling information for Sounding Reference Signal (SRS) for positioning that includes multiple reserved occasions to transmit the SRS. The multiple reserved occasions may be used on all or on only a subset of configured SRS resources. The UE transmits the positioning SRS on a reserved occasion that is first available for transmission, e.g., without collision or other restrictions of transmission of the SRS. The UE does not transmit the positioning SRS on any earlier reserved occasions that is not available or any subsequent reserved occasions. The base station may attempt to decode the SRS on each reserved occasion until the positioning SRS is transmitted. The base station may reassign unused reserved occasions to other UEs or to other channels. The base station may report positioning measurements with associated time stamps for the reserved occasion on which the positioning SRS was received.

In one implementation, a method for supporting scheduling of Sounding Reference Signals (SRS) for a user equipment (UE) performed by the UE in a wireless network, includes receiving from a serving base station an SRS schedule for transmitting a positioning SRS, the SRS schedule comprising multiple reserved occasions for transmitting the positioning SRS; and transmitting the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions.

In one implementation, a user equipment (UE) configured to support scheduling of Sounding Reference Signals (SRS) in a wireless network, includes a wireless transceiver configured to wirelessly communicate with a serving base station in the wireless network; at least one memory; at least one processor coupled to the wireless transceiver and the at least one memory, wherein the at least one processor is configured to: receive from a serving base station an SRS schedule for transmitting a positioning SRS, the SRS schedule comprising multiple reserved occasions for transmitting the positioning SRS; and transmit the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions.

In one implementation, a user equipment (UE) configured to support scheduling of Sounding Reference Signals (SRS) in a wireless network, includes means for receiving from a serving base station an SRS schedule for transmitting a positioning SRS, the SRS schedule comprising multiple reserved occasions for transmitting the positioning SRS; and means for transmitting the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions.

In one implementation, a non-transitory storage medium including program code stored thereon, the program code is operable to configure at least one processor in a user equipment (UE) to support scheduling of Sounding Reference Signals (SRS) in a wireless network, includes program code to receive from a serving base station an SRS schedule for transmitting a positioning SRS, the SRS schedule comprising multiple reserved occasions for transmitting the positioning SRS; and program code to transmit the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions.

In one implementation, a method for supporting scheduling of Sounding Reference Signals (SRS) for a user equipment (UE) performed by a base station in a wireless network, includes transmitting to the UE an SRS schedule for transmission of a positioning SRS by the UE, the SRS schedule comprising multiple reserved occasions for transmitting the positioning SRS, wherein the UE transmits positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions; and receiving the positioning SRS on one of the reserved occasions and stop SRS processing on any subsequent reserved occasions.

In one implementation, a base station configured to support scheduling of Sounding Reference Signals (SRS) for a user equipment (UE) in a wireless network, includes an external interface configured to wirelessly communicate with the UE in the wireless network; at least one memory; at least one processor coupled to the external interface and the at least one memory, wherein the at least one processor is configured to: transmit to the UE an SRS schedule for transmission of a positioning SRS by the UE, the SRS schedule comprising multiple reserved occasions for transmitting the positioning SRS, wherein the UE transmits positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions; and receive the positioning SRS on one of the reserved occasions and stop SRS processing on any subsequent reserved occasions.

In one implementation, a base station configured to support scheduling of Sounding Reference Signals (SRS) for a user equipment (UE) in a wireless network, includes means for transmitting to the UE an SRS schedule for transmission of a positioning SRS by the UE, the SRS schedule comprising multiple reserved occasions for transmitting the positioning SRS, wherein the UE transmits positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions; and means for receiving the positioning SRS on one of the reserved occasions and stop SRS processing on any subsequent reserved occasions.

In one implementation, a non-transitory storage medium including program code stored thereon, the program code is operable to configure at least one processor in a base station to support scheduling of Sounding Reference Signals (SRS) for a user equipment (UE) in a wireless network, includes program code to transmit to the UE an SRS schedule for transmission of a positioning SRS by the UE, the SRS schedule comprising multiple reserved occasions for transmitting the positioning SRS, wherein the UE transmits positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions; and program code to receive the positioning SRS on one of the reserved occasions and stop SRS processing on any subsequent reserved occasions.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
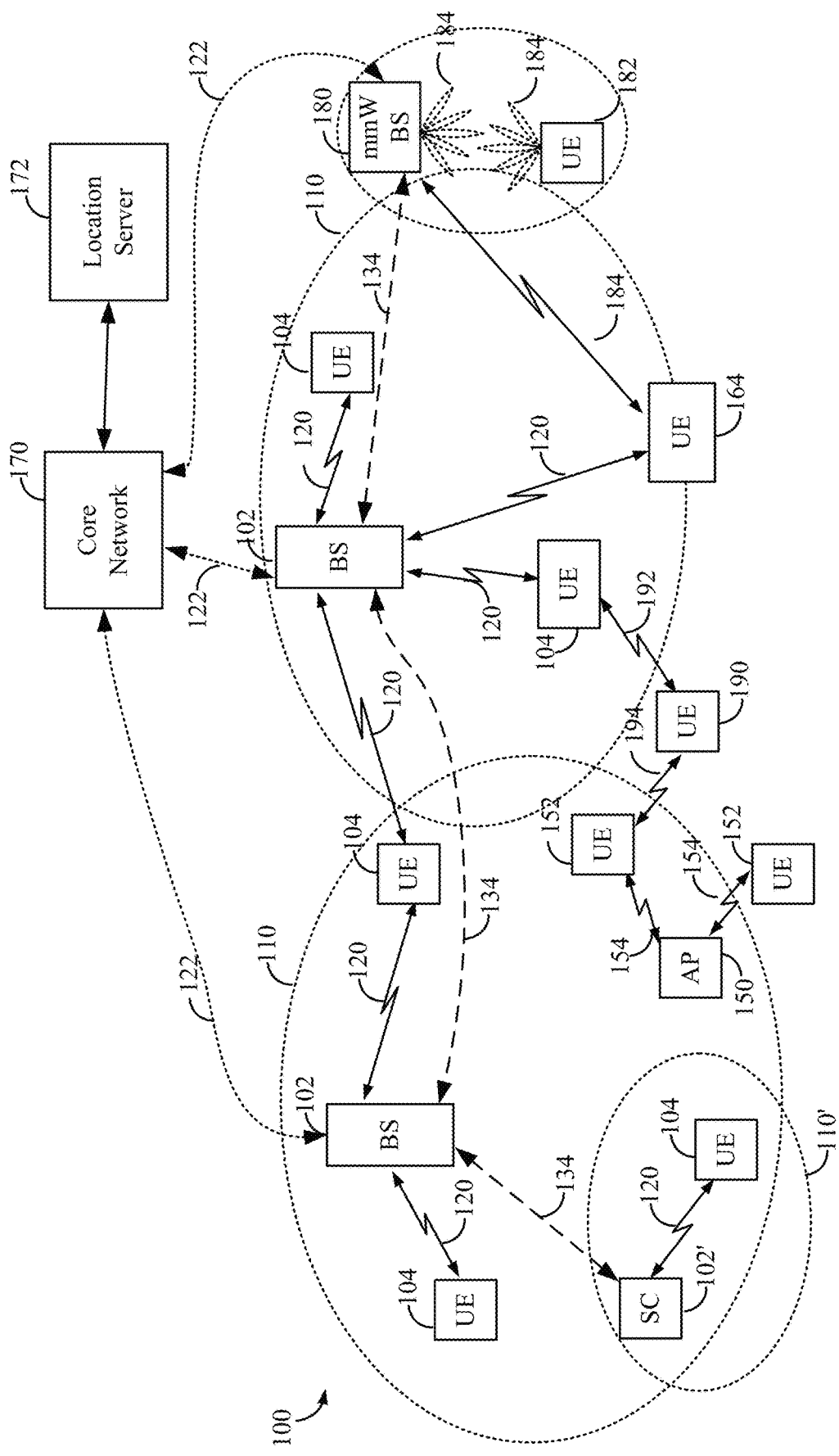
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 1002.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

In general, positioning for a UE is supported using DL positioning reference signals (PRS) and/or UL reference signals, such as sounding reference signals (SRS) for positioning, sometimes referred to as positioning SRS, SRS for positioning, SRS-Pos, or variations thereof. By way of example, DL and UL reference signals facilitate support of positioning techniques such as DL Time Difference of Arrival (DL-TDOA), DL Angle of Departure (DL-AoD), UL-TDOA, UL Angle of Arrival (UL-AoA), multi-cell Round Trip Time (RTT) and Enhanced Cell-ID (E-CID). The UE may generate positioning measurements based on DL reference signals, e.g., DL PRS. For example, the following UE positioning measurements are specified for serving, reference, and neighboring cells: DL RSTD (reference signal time difference) measurements, DL RSRP (reference signal received power) measurements, and UE reception and transmission (RX-TX) time difference measurements. Base station may also generate positioning measurements based on UL reference signals, e.g., positioning SRS. For example, the following base station measurements are specified: UL RTOA (relative time of arrival) measurements, UL Angle of Arrival (AoA) measurements (including Azimuth and Zenith Angles), UL RSRP (reference signal received power) measurements, and base station RX-TX time difference measurements.

In general, PRS is a UE DL resource and SRS is a UE UL resource. The PRS and SRS are scheduled. For example, the scheduling of PRS may be controlled by a network entity, such as a location server, e.g., a location management function (LMF) in a NR network. The scheduling of SRS may also be controlled by the same or different network entity, such as a base station, e.g., a gNB in a NR network. For example, the network entity may provide the UE with scheduling information for the PRS, e.g., indicating that PRS is scheduled at time T1. The scheduling information further enables the UE to transmit the SRS at designated times, e.g., at time T2. For example, the network entity may provide the UE with the PRS–SRS delta, i.e., T2–T1. The length of the PRS and SRS symbols may also be provided to the UE by the network entity.

The scheduling of the PRS and SRS is static and time critical. For example, if the UE misses the scheduled time T1, the UE will not be able to decode the PRS from the base station. Similarly, if the UE fails to transmit the SRS at the scheduled time T2, or transmits the SRS with a large offset from time T2, the base station will not be able to decode the SRS from the UE.

The scheduled DL PRS from base stations are regular periodic signals and is not unexpectedly dropped. On the other hand, UL SRS is not a regular signal and is scheduled as needed. There are many scenarios where the scheduled time for transmission of positioning SRS is not available to the UE and the positioning SRS is dropped. In these scenario's, the base station will not be able to receive and decode the SRS, thereby interfering with positioning for the UE. For example, in one scenario, the scheduled positioning SRS may collide with a priority UE uplink message, such as a mobile terminated (MT) page, mobile originated (MO) call, Earthquake and Tsunami Warning System (ETWS) page, regular Physical Uplink Shared Channel (PUSCH), Physical Uplink Control Channel (PUCCH), etc. In another scenario, a collision may occur with other types of non-positioning SRS, which may be periodic/semi-periodic and aperiodic SRS. In another scenario, a collision may occur due to UL transmission on another carrier. For example, there may be a collision due to scheduled simultaneous transmission of PUSCH/SRS on one carrier and SRS-Pos on another carrier. Additionally, the SRS may be dropped (or transmitted with lower power) due to Maximum Permission Exposure (MPE) constraints, e.g., for Frequency Range FR2. Additionally, the UE may not be able to transmit SRS-Pos in an unlicensed spectrum due to channel access failure.

If the scheduled time for transmission of positioning SRS is not available to the UE and the positioning SRS is dropped, the base station will not be able to perform the desired positioning measurement based on the SRS-Pos because the SRS-Pos will not be received. In some implementations, however, the UL positioning measurements may be important, e.g., during emergencies or other situations where a timely position of the UE is desired. Accordingly, it is desirable to support positioning of a UE in scenarios in which the UE is not able to transmit the positioning SRS at the designated time.

Implementations are described herein for supporting scheduling of SRS to minimize or resolve issues related to the UE's inability to transmit the positioning SRS at a designated time.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial RRC connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
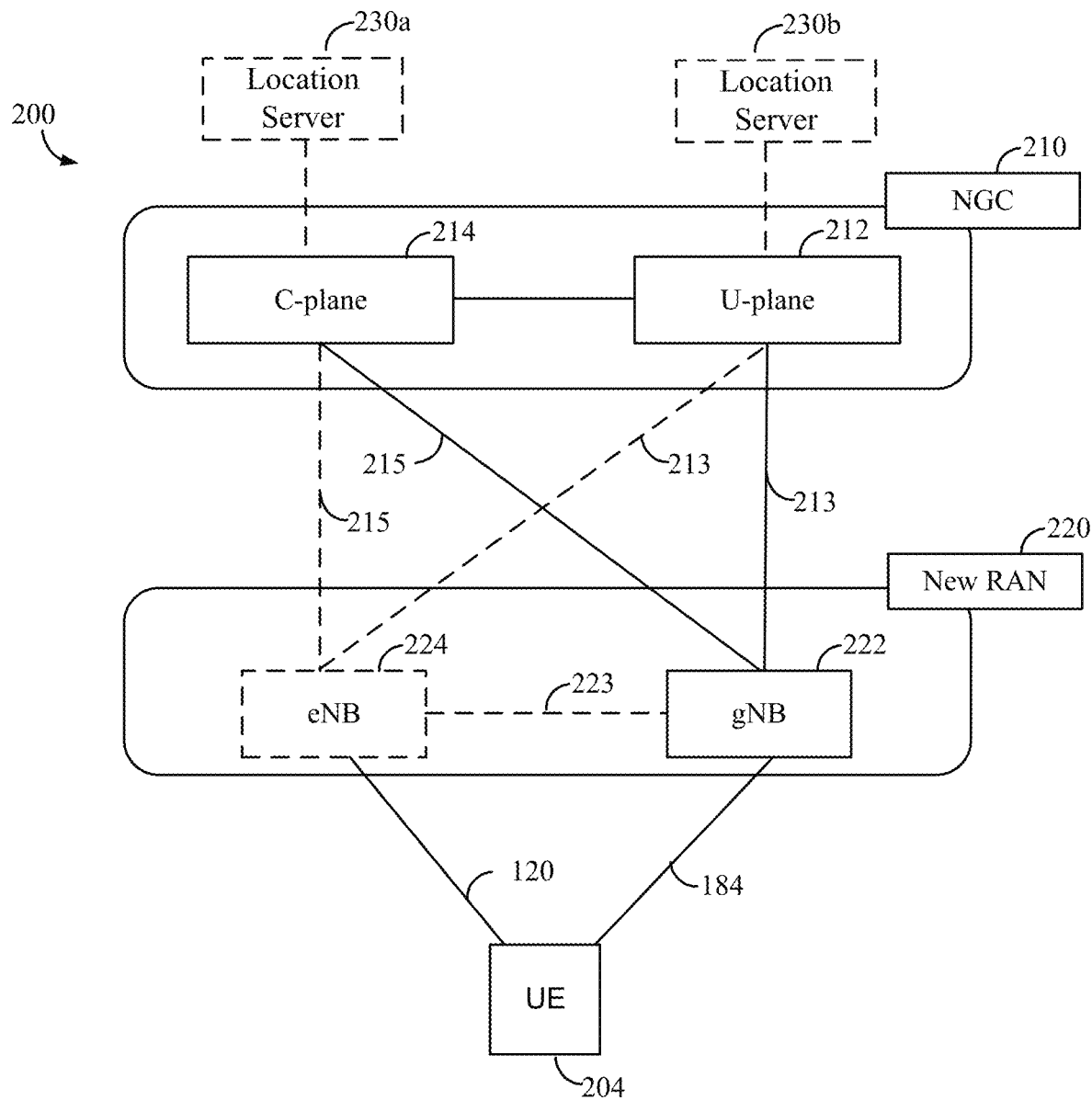
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NGC) 215 connect the gNB 222 to the NGC 210 and specifically to the control plane functions 214 and user plane functions 212. In an additional configuration, an eNB 224 may also be connected to the NGC 210 via NGC 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to LMF 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
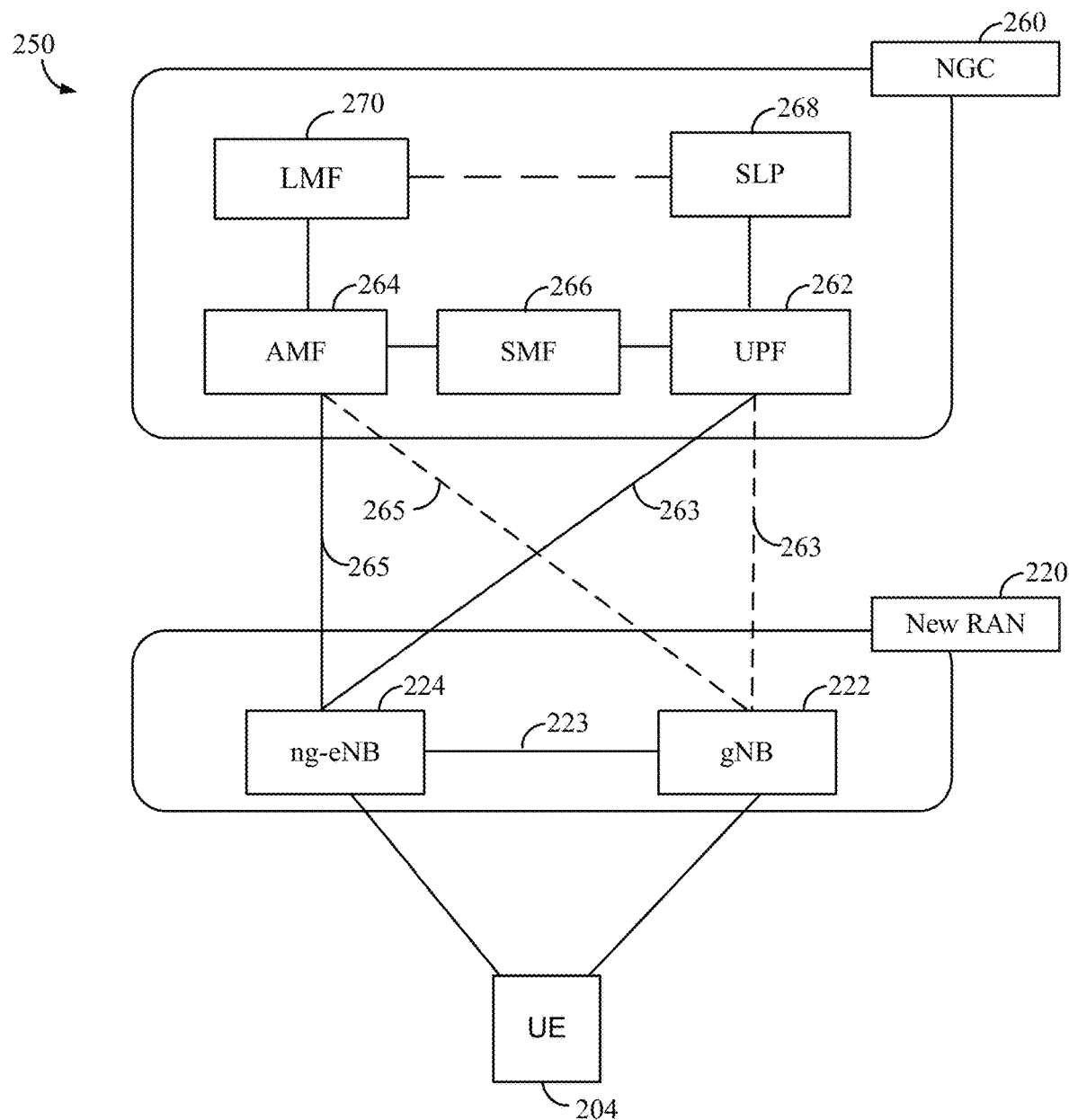

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to LMF 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
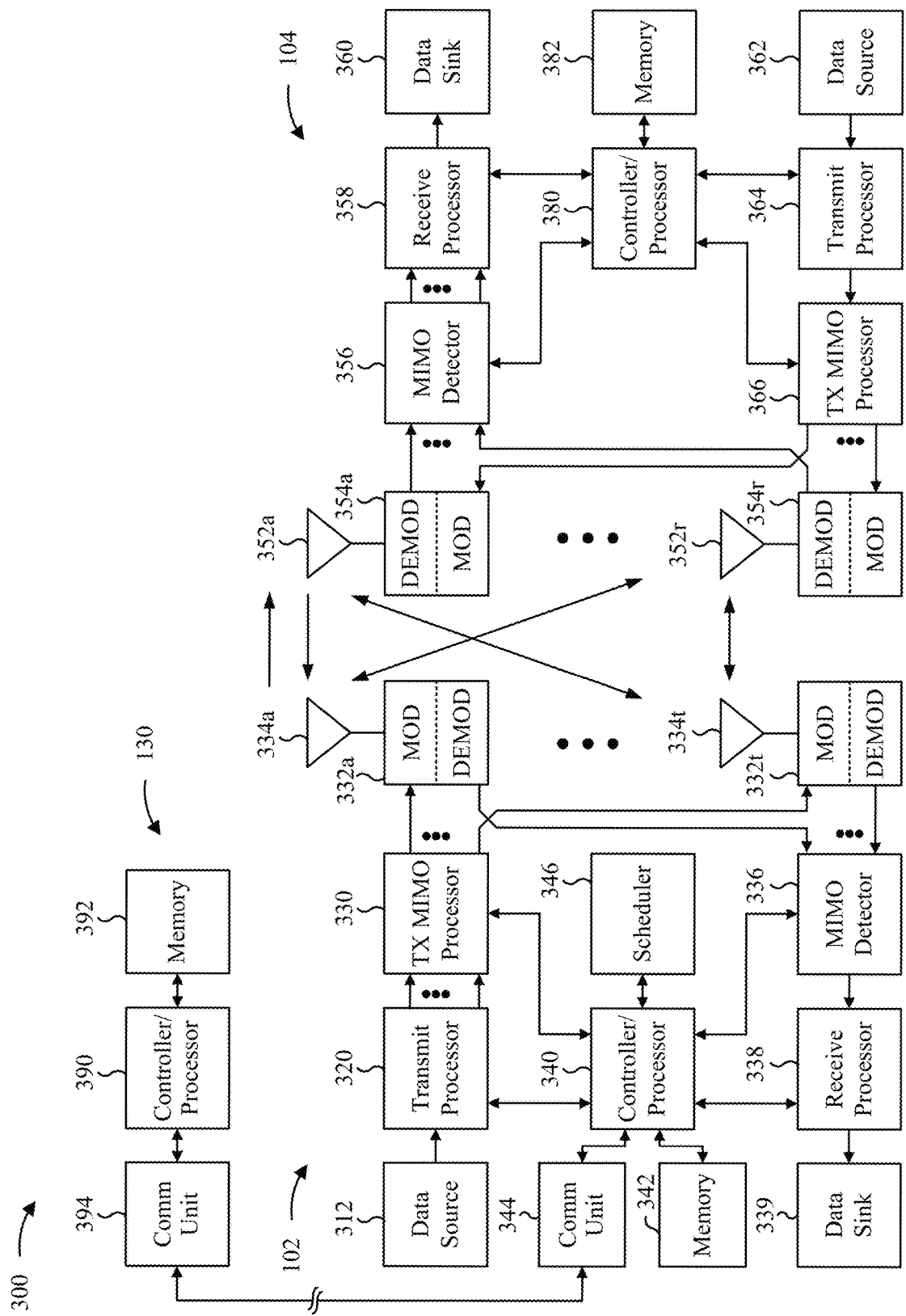
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 130 via communication unit 344. Network controller 130 may include communication unit 394, controller/processor 390, and memory 392.

Controller/processor 340 of base station 102, controller/processor 380 of UE 104, and/or any other component(s) of FIG. 3 may perform one or more techniques associated with scheduling positioning SRS with multiple reserved occasions, as described in more detail elsewhere herein. For example, controller/processor 340 of base station 102, controller/processor 380 of UE 104, and/or any other component(s) of FIG. 3 may perform or direct operations of, for example, processes 1300 and 1400 of FIGS. 13 and FIG. 14 and/or other processes as described herein. Memories 342 and 382 may store data and program codes for base station 102 and UE 104, respectively. In some aspects, memory 342 and/or memory 382 may comprise a non-transitory computer-readable medium storing one or more instructions for wireless communication. For example, the one or more instructions, when executed by one or more processors of the base station 102 and/or the UE 104, may perform or direct operations of, for example, processes 1300 and 1400 of FIGS. 13 and FIG. 14, and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
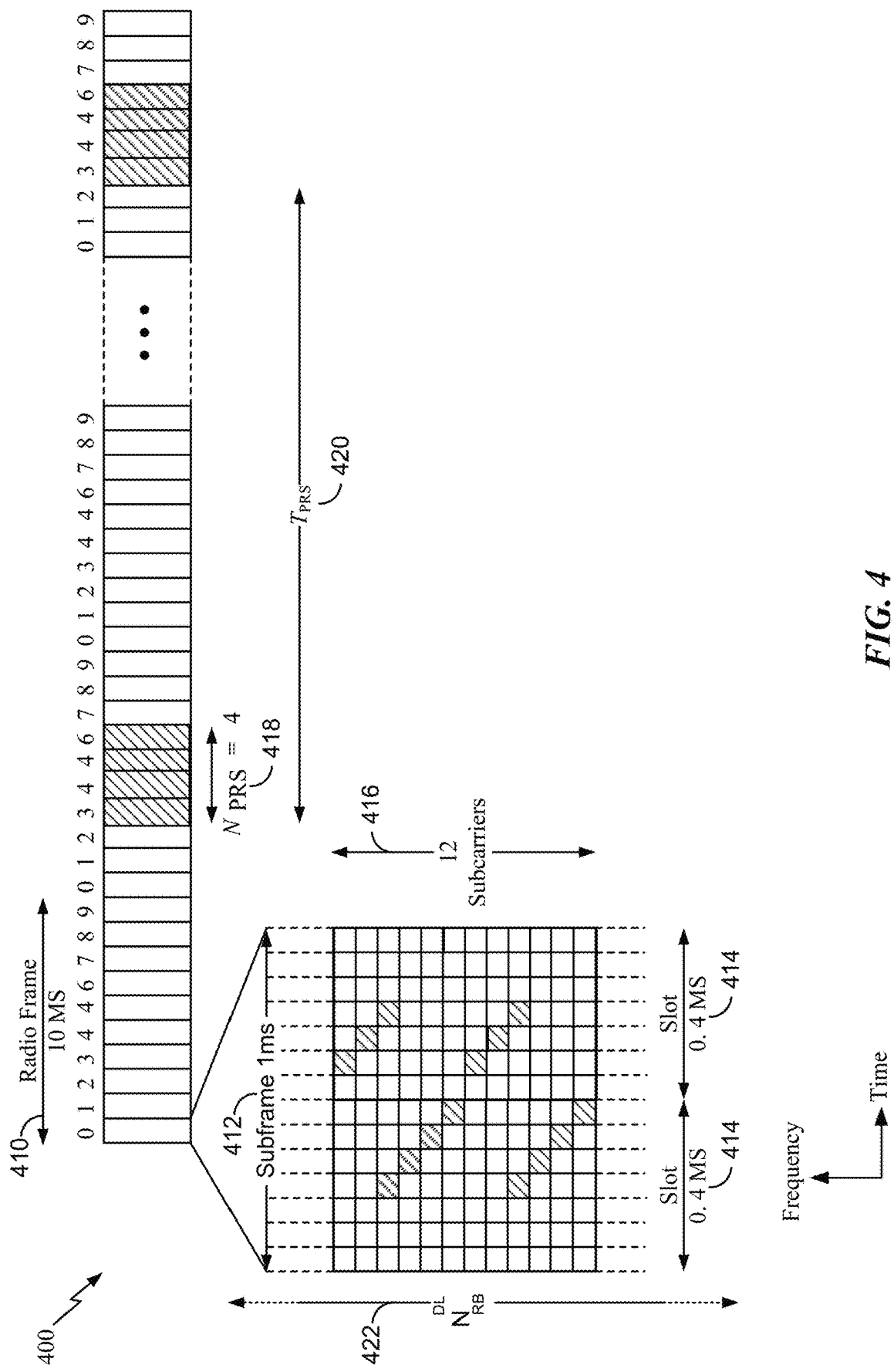
FIG. 4 is a diagram of a structure of an exemplary subframe sequence with positioning reference signal (PRS) positioning occasions.

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that can be used for positioning, such as but not limited to, PRS signals in LTE/NR, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE may transmit UL PRS for positioning. The UL PRS may be, e.g., sounding reference signals (SRS) for positioning. Using received DL PRS from base stations and/or UL PRS transmitted to base stations, various positioning measurements may be performed, such as time of arrival (TOA), reference signal time difference (RSTD), time difference of arrival (TDOA), reference signal received power (RSRP), time difference between reception and transmission of signals (Rx-Tx), angle of arrival (AoA), or angle of departure (AoD), etc. In some implementations, the DL PRS and UL PRS are received and transmitted jointly to perform multi-cell positioning measurements, such as multi-Round Trip Time (RTT).

Various positioning technologies rely on DL PRS or UL SRS-Pos. For example, positioning technologies that use reference signal include downlink based positioning, uplink based positioning, and combined downlink and uplink based positioning. For example, downlink based positioning includes positioning methods such as DL-TDOA and DL-AoD. Uplink based positioning includes positioning method such as UL-TDOA and UL-AoA. Downlink and uplink based positioning includes positioning method, such as RTT with one or more neighboring base station (multi-RTT).

Other positioning methods exist, including methods that do not rely on PRS. For example, Enhanced Cell-ID (E-CID) is based on radio resource management (RRM) measurements.

As discussed above, UL SRS may be dropped when the scheduled time for transmission of positioning SRS is not available. The SRS may be dropped for example, for a variety of reasons, including collisions with priority UE uplink messages, higher priority non-positioning SRS, UL transmissions on another carrier, or for other reasons, such as MPE constraints and channel access failure.

Figure 5:
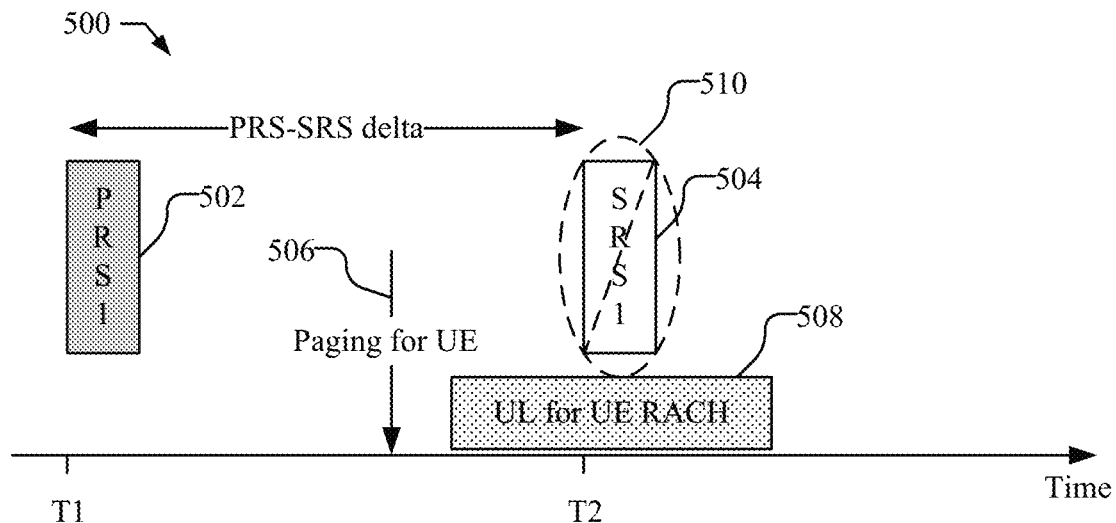
FIG. 5 is a graph illustrating SRS collision with a high priority UL message.

FIG. 5, for example, is a graph 500 illustrating SRS collision with a high priority UL message. A UE 104 may be scheduled to receive DL PRS1 502 at time T1 and to transmit UL SRS1 504 at time T2, with PRS-SRS delta (T2-T1). As illustrated, however, the UE may receive a page 506, e.g., for a Random Access Channel (RACH) procedure 508, before time T2. The SRS1 504 collides with the RACH procedure 508, which has a higher priority than the SRS1 504. Accordingly, the scheduled time T2 for transmission of SRS1 504 is not available to the UE 104 and the SRS1 504 is dropped, as illustrated by dotted lines 510. It should be understood that while FIG. 5 illustrates collision with a RACH procedure 508, SRS for positioning may be similarly dropped for a variety of reasons as discussed above.

In this example, because the SRS1 504 is dropped, the base station 102 cannot perform positioning measurements with the SRS1 504, which may delay or inhibit position determination of the UE 104. It may be desirable to support positioning of a UE in scenarios, such as illustrated in FIG. 5, in which the UE is not able to transmit the positioning SRS at the designated time. Accordingly, scheduling of SRS may be configured to minimize or resolve issues related to the UE's inability to transmit the positioning SRS at a designated time.

In one implementation, multiple occasions may be reserved for transmissions of a positioning SRS and thus, if the UE 104 to unable to transmit the SRS at a designated time, the UE 104 may transmit the SRS in a subsequent occasion. The multiple reserved occasions for the positioning SRS may be provided in assistance data to the UE.

Figure 6:
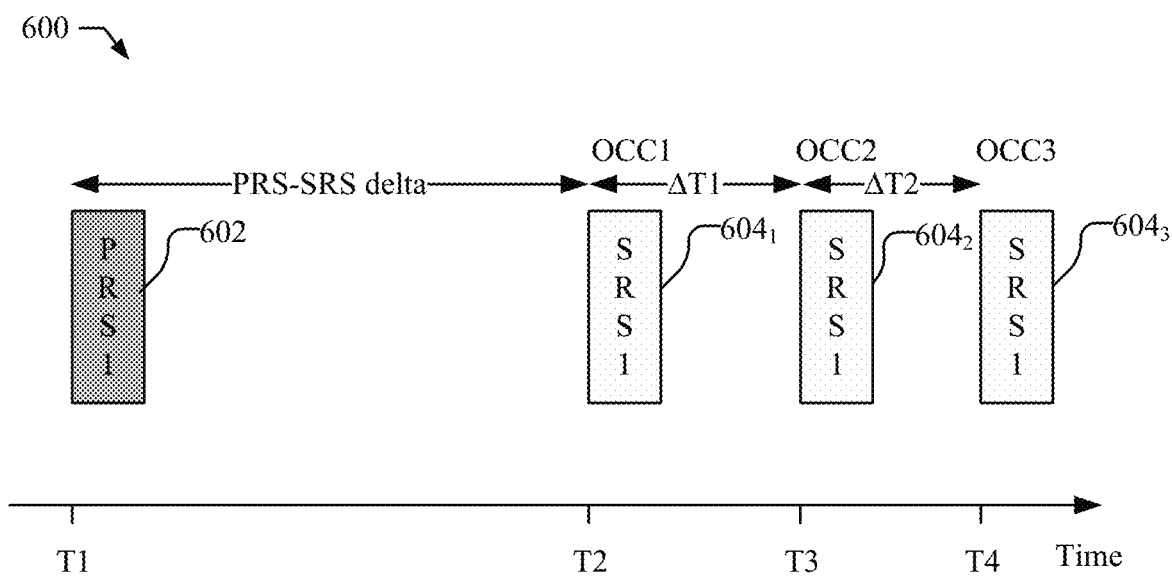
FIG. 6 is a graph illustrating the scheduling of positioning SRS with multiple reserved occasions.

FIG. 6, for example, is a graph 600 illustrating the scheduling of positioning SRS with multiple reserved occasions. A UE 104, for example, may be scheduled by a base station 102 to receive DL PRS1 602 at time T1 and to transmit UL SRS1 at one of several reserved occasions, illustrated as occasions OCC1 $604_1$, OCC2 $604_2$, and OCC3 $604_3$. The first occasion OCC1 $604_1$ may be reserved with respect to the DL PRS1 602, e.g., after PRS-SRS delta, which is at time T2. Each of the remaining occasions, OCC2 $604_2$, and OCC3 $604_3$ may be reserved with a time offsets $\Delta T1$, e.g., at time T3, and $\Delta T2$, e.g., at time T4. If desired, the time offsets between the reserved occasions, e.g., $\Delta T1$ and $\Delta T2$, may be the same length or different lengths, which may be advantageous if a periodic signal is interfering with reserved occasions OCC1 $604_1$ and OCC2 $604_2$. The UE 104 will use the first reserved occasion OCC1 $604_1$ if the UE 104 is able to transmit the SRS at that time T2. The UE 104 will use the second occasion OCC2 $604_2$ only if the UE 104 is unable to transmit the SRS1 at the first reserved occasion OCC1 $604_1$, e.g., there is a collision at time T2. Similarly, the UE 104 will use the third occasion OCC3 $604_3$ only if the UE 104 is unable to transmit the SRS1 at the first reserved occasion OCC1 $604_1$ and the second reserved occasion OCC2 $604_2$, e.g., due to collisions at times T2 and T3. It should be understood that while three reserved occasions are illustrated in FIG. 6, additional or fewer reserved occasions may be used.

Figure 7:
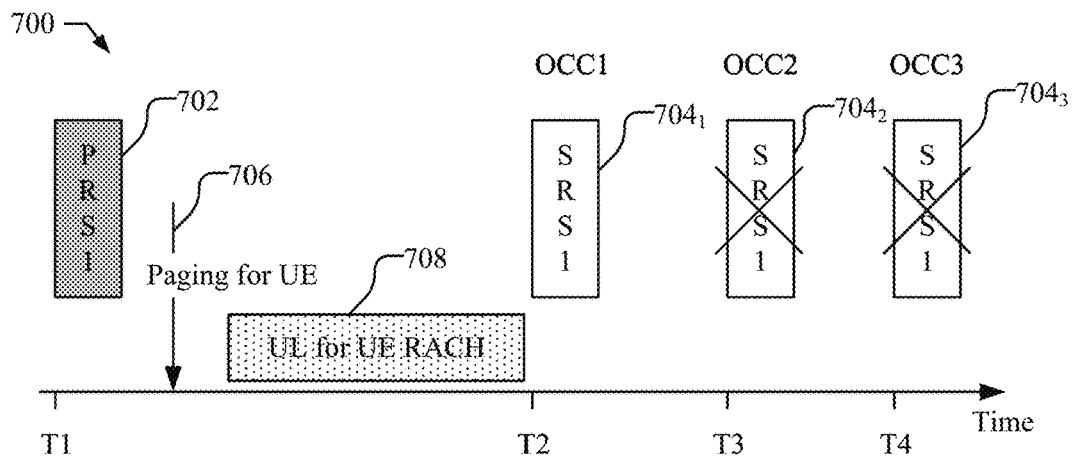
FIG. 7 is a graph that illustrates positioning SRS scheduled with multiple reserved occasions, where the positioning SRS is transmitted at the first reserved occasion.

FIG. 7, by way of example, is a graph 700 that illustrates positioning SRS scheduled with multiple reserved occasions, where the positioning SRS is transmitted at the first reserved occasion. Similar to the scheduled SRS shown in FIG. 6, a UE 104 may be scheduled by a base station 102 to receive DL PRS1 702 at time T1 and to transmit UL SRS1 at one of several reserved occasions, illustrated as occasions OCC1 $704_1$, OCC2 $704_2$, and OCC3 $704_3$, which are reserved for times T2, T3, and T4, respectively.

As illustrated in FIG. 7, the UE 104 is able to transmit the positioning SRS1 on the first reserved occasion OCC1 $704_1$ at time T2. For example, the UE 104 may receive a page 706, e.g., for a RACH procedure 708, but the RACH procedure 708 does not collide with the first reserved occasion OCC1 $704_1$ at time T2. Accordingly, there is no collision, and the UE 104 will transmit the positioning SRS1 on only the first reserved occasion OCC1 $704_1$. The base station 102 will decode the SRS1 transmitted at first occasion OCC1 $704_1$ and will process the SRS, e.g., to determine a position measurement. As illustrated by the "X's" in FIG. 7, if the UE 104 is able to transmit the positioning SRS1 on the first occasion OCC1 $704_1$, the UE 104 does not transmit the positioning SRS1 on the remaining occasions OCC2 $704_2$ and OCC3 $704_3$. The base station 102 may reassign the remaining occasions OCC2 $704_2$ and OCC3 $704_3$ to other UEs or other channels. The time offsets between the reserved occasions, e.g., $\Delta T1$ and $\Delta T2$ (shown in FIG. 6) may be lengths that are sufficient to provide the base station 102 with time to reassign the unused reserved occasions.

Figure 8:
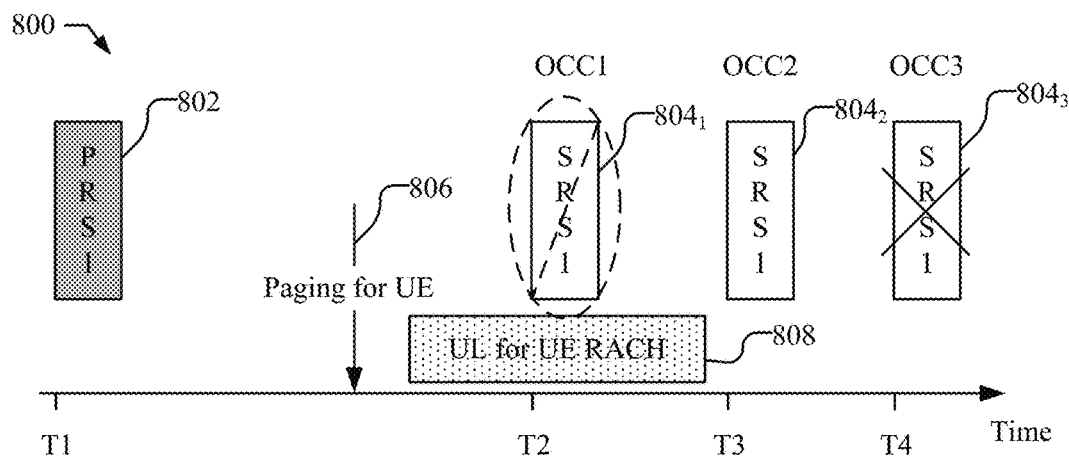
FIG. 8 is a graph that illustrates positioning SRS scheduled with multiple reserved occasions, where the positioning SRS is transmitted at a second reserved occasion.

FIG. 8, by way of example, is a graph 800 that illustrates positioning SRS scheduled with multiple reserved occasions, where the positioning SRS is transmitted at a second reserved occasion. Similar to the scheduled SRS shown in FIGS. 6 and 7, a UE 104 may be scheduled by a base station 102 to receive DL PRS1 1002 at time T1 and to transmit UL SRS1 at one of several reserved occasions, illustrated as occasions OCC1 $804_1$, OCC2 $804_2$, and OCC3 $804_3$, which are reserved for times T2, T3, and T4, respectively.

As illustrated in FIG. 8, the UE 104 is unable to transmit the positioning SRS1 on the first reserved occasion OCC1 $804_1$ at time T2. For example, the UE 104 may receive a page 806, e.g., for a RACH procedure 808 that collides with the first reserved occasion OCC1 $804_1$ at time T2. Accordingly, as illustrated by the dotted line, the first reserved occasion OCC1 $804_1$ is dropped. The RACH procedure 808, however, does not collide with the second reserved occasion OCC2 $804_2$. Accordingly, the UE 104 will use the second reserved occasion OCC2 $804_2$ to transmit the positioning SRS1. As illustrated by the "K" in FIG. 8, because the UE 104 is able to transmit the positioning SRS1 on the second occasion OCC2 $804_2$, the UE 104 does not transmit the positioning SRS1 on the remaining occasion OCC3 $804_3$. The base station 102 will attempt to decode the positioning SRS1 at the first occasion OCC1 $804_1$, but will not decode anything as the positioning SRS1 was not transmitted then. The base station 102 will decode the positioning SRS1 on OCC2 $804_2$, and will receive the tone and will process the SRS1, e.g., to determine a position measurement. The base station 102 will not attempt to decode the positioning SRS1 at remaining occasions, e.g., occasion OCC3 $804_3$, because the positioning SRS1 has already been received. The base station 102 may reassign the remaining occasion OCC3 $804_3$ to other UEs or other channels.

Figure 9:
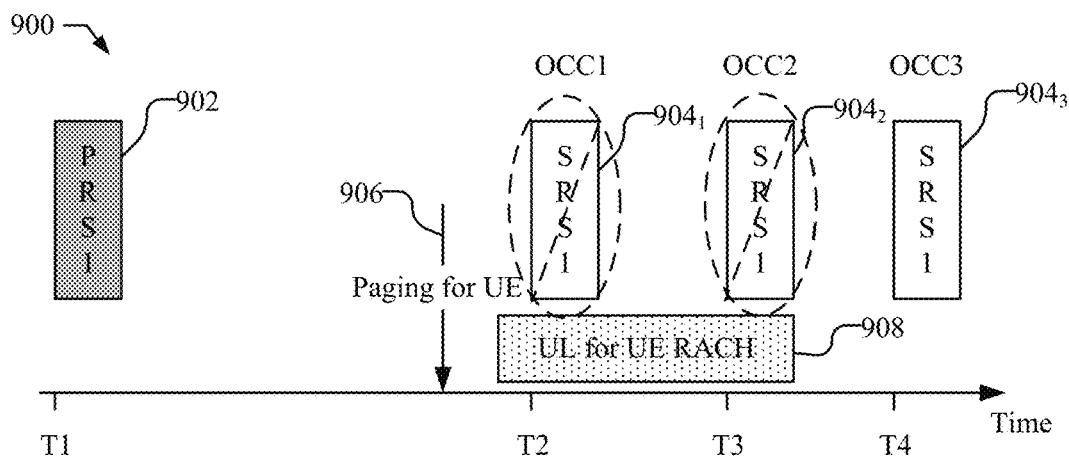
FIG. 9 is a graph that illustrates positioning SRS scheduled with multiple reserved occasions, where the positioning SRS is transmitted at a third reserved occasion.

FIG. 9, by way of example, is a graph 900 that illustrates positioning SRS scheduled with multiple reserved occasions, where the positioning SRS is transmitted at a third reserved occasion. Similar to the scheduled SRS shown in FIGS. 6, 7, and 8, a UE 104 may be scheduled by a base station 102 to receive DL PRS1 902 at time T1 and to transmit UL SRS1 at one of several reserved occasions, illustrated as occasions OCC1 904₁, OCC2 904₂, and OCC3 904₃, which are reserved for times T2, T3, and T4, respectively.

As illustrated in FIG. 9, the UE 104 is unable to transmit the positioning SRS1 on the first or second reserved occasions OCC1 904₁ and OCC1 904₂. For example, the UE 104 may receive a page 806, e.g., for a RACH procedure 808 that collides with both the first reserved occasion OCC1 904₁ at time T2 and the second reserved occasion OCC2 904₂ at time T3. FIG. 9, illustrates a single RACH procedure colliding with both the first and second reserved occasions merely as an example. It should be understood that the UE 104 may be unable to transmit the positioning SRS1 on the first or second reserved occasions OCC1 904₁ and OCC1 904₂, due to separate reasons, e.g., due to collisions with different messages. Because the UE 104 is unable to transmit the positioning SRS1 on the first or second reserved occasions OCC1 904₁ and OCC1 904₂, both the first or second reserved occasions OCC1 904₁ and OCC1 904₂ are dropped as illustrated with dotted lines. The RACH procedure 908, however, does not collide with the third reserved occasion OCC3 904₃. Accordingly, the UE 104 will use the third occasion OCC3 904₃ to transmit the positioning SRS1. The base station 102 will attempt to decode the positioning SRS1 at the first and second occasions OCC1 904₁ and OCC1 904₂, but will not decode anything because the positioning SRS1 is not transmitted at these occasions. The base station 102 will decode the positioning SRS1 on the third occasion OCC3 904₃, will receive the tone and will process the SRS1, e.g., to determine a position measurement. The base station 102 will not attempt to decode the positioning SRS1 at remaining occasions (if any), because the positioning SRS1 has already been received.

In some implementations, the base station 102 may report to the location server 172, an estimated time stamp, e.g., the time of reception or offset from the PRS (i.e., PRS–SRS delta) associated with the reserved occasion at which the positioning SRS is received. The location server 172, for example, may use the estimated time or time offset with respect to the DL PRS that is associated with positioning measurements to improve positioning accuracy or generate uncertainty values associated with positioning.

In some implementations, the use of multiple reserved occasions for scheduling an SRS transmission may be restricted to high priority positioning SRS transmissions. For example, a location server 172 may provide the UE 104 with a SRS schedule that is configured for a plurality of SRS resources, where only a subset of the plurality of SRS resources are configured with multiple reserved occasions for transmitting the positioning SRS. For example, the location server 172 may provide an SRS schedule to the UE 104 to transmit positioning SRS to a number, e.g., 12, of TRPS, but may indicate that only a subset, e.g., 4, TRPs will have multiple reserved occasions. Thus, the UE 104 will use multiple occasions for only high priority SRS resources, and for the remaining SRS resources, the UE 104 may drop the positioning SRS if the UE 104 is unable to transmit at the scheduled time. The set of SRS resources that may be considered high priority, and thus, may have multiple reserved occasions may be configured, e.g., via radio resource control (RRC) or changed via a Medium Access Control-Control Element (MAC-CE) MAC-CE, or downlink control information (DCI) signaling etc. In other implementations, the selection of the subset of the plurality of SRS resources that may be considered high priority, and thus, may have multiple reserved occasions may be based on a positioning method used with the positioning SRS. For example, multiple reserved occasions may be appropriate for some positioning methods, such as multi-cell RTT and may be less appropriate with other types of positioning methods such as TDOA.

Figure 10:
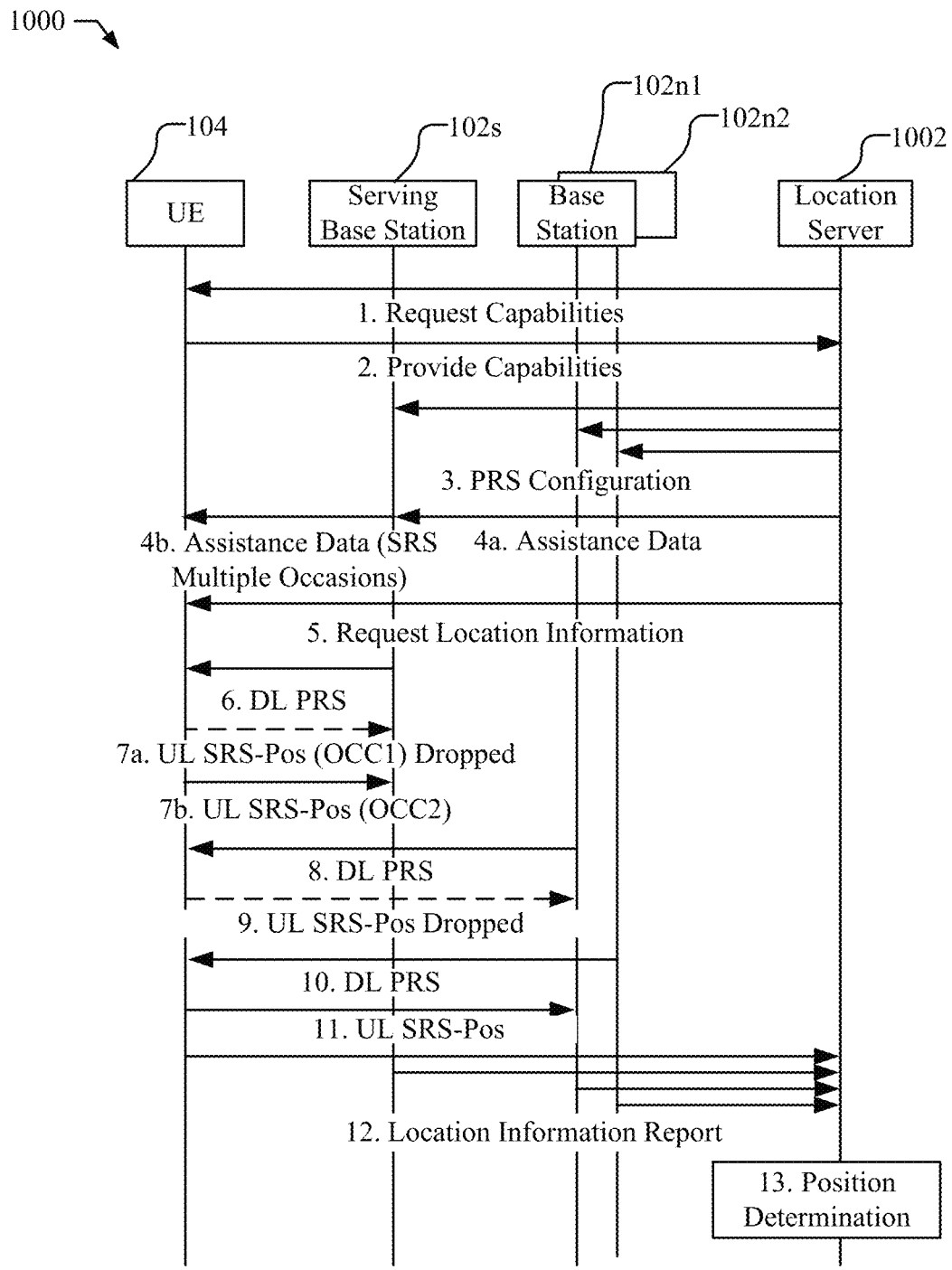
FIG. 10 shows a signaling flow that illustrates various messages sent between components of the wireless communication system in a positioning session that includes scheduling positioning SRS with multiple reserved occasions.

FIG. 10 shows a signaling flow 1000 that illustrates various messages sent between components of the wireless communication system 100 depicted in FIG. 1, in a positioning session that includes scheduling positioning SRS with multiple reserved occasions, as discussed herein. Flow diagram 1000 illustrates UE 104, a serving base station 102s, which may be an eNB or gNB, neighboring base stations 102n1 and 102n2, and a location server 1002, which may be, e.g., location server 172, 230a, 230b, or LMF 270. The serving base station 102s and neighboring base stations 102n1 and 102n2 may sometimes be referred to herein as base stations 102. While the flow diagram 1000 is discussed, for ease of illustration, in relation to a 5G NR wireless access, signaling flows similar to FIG. 10 involving other types of networks and base stations will be readily apparent to those with ordinary skill in the art. In the signaling flow 1000, it is assumed that the UE 104 and location server 1002 communicate using the LPP positioning protocol, although use of NPP or a combination of LPP and NPP or other future protocol, such as NRPPa, is also possible. Further, FIG. 10 may not show all messages transmitted between entities in a positioning session.

At stage 1, the location server 1002 sends a request capabilities message to the UE 104.

At stage 2, the UE 104 may send provide capabilities message to the location server 1002, the UE 104 may respond by providing various location-related capabilities, such as capabilities to support different position methods and to support different network measurements and assistance data etc.

At stage 3, the location server 1002 may provide the base stations 102 with PRS configurations.

At stages 4a and 4b, the location server 1002 may provide the serving base station and the UE 104 with assistance data, which may include scheduling information for the PRS as well as scheduling information for positioning SRS, including multiple reserved occasions for one or more SRS resources. The first reserved occasion, for example, may be scheduled for a predetermined time after the scheduled PRS (e.g., PRS–SRS delta). Reserved occasions may be scheduled with a known time offset relative to a preceding reserved occasion (e.g., ΔT1 and ΔT2), which may the same of may be different. The schedule for positioning SRS may include a plurality of SRS resources, where only a subset of the SRS resources may be configured with multiple reserved occasions for transmitting the positioning SRS, and the remaining SRS resources are configured with only one occasion.

At stage 5, the location server 105 may request location information from base stations 102 and the UE 104.

At stage 6, the serving bas station 102s transmits a DL PRS to the UE 104, which may generate a positioning measurement using the received PRS.

At stage 7a, the UE 104 is scheduled to transmits positioning SRS to the serving base station 102s on a first reserved occasion OCC1, which is dropped, as indicated by the dotted line, because the UE 104 is unable to transmit the positioning SRS at this occasion, e.g., due to a collision with another message (not shown). The first reserved occasion OCC1 may not be available, for example, due to collision with a higher priority uplink (UL) transmission, collision with a higher priority non-positioning SRS, collision with an uplink transmission on another carrier, maximum permissible exposure constraints, and channel access failure. The serving base station 102s may attempt to decode the positioning SRS, but will not as the positioning SRS is not transmitted.

At stage 7b, the UE 104 transmits the positioning SRS to the serving base station 102s on a second reserved occasion OCC2. The serving base station 102s receives the positioning SRS and may generate a positioning measurement. The UE 104 will not transmit the positioning SRS on any subsequent reserved occasion and the serving base station 102s may reassign any subsequent reserved occasion to another UE or other channel.

At stage 8, base station 102n1 transmits a DL PRS to the UE 104, which may generate a positioning measurement using the received PRS.

At stage 9, the UE 104 may be scheduled to transmit positioning SRS to the base station 102n1, which may be dropped, as indicated by the dotted line, because the UE 104 is unable to transmit the positioning SRS at the scheduled time. The base station 102n1 may not be scheduled with multiple reserved occasions, e.g., because the base station 102n1 may have a low priority (e.g., may be distant from the UE 104). The indication that the base station 102n1 does not have multiple reserved occasions (and that the serving base station 102s does have multiple reserved occasions) may be provided to the UE 104 in the assistance data at stage 4b or in other messages, such as a RRC, MAC-CE, or DCI signaling (not shown). The selection of the base stations that are considered high priority, and thus, may have multiple reserved occasions may be based on the positioning method used with the positioning SRS, e.g., multi-cell RTT vs OTDOA.

At stage 10, base station 102n2 transmits a DL PRS to the UE 104, which may generate a positioning measurement using the received PRS.

At stage 11, the UE 104 may be transmit positioning SRS to the base station 102n2. The serving base station 102s receives the positioning SRS and may generate a positioning measurement.

At stage 12, the UE 104 and base stations 102s and 102n2 may transmit location information to the location server 1002. The location information, for example, may include any positioning measurements generated by the UE 104 and the base stations 102s and 102n2 based on UL positioning SRS received from the UE 104. The serving base station 102s may include a time stamp for the second positioning occasion OCC2 that is associated with the positioning measurement. The base station 102n1 does not transmit a location report because the positioning SRS at stage 9 was dropped. In some implementations, base station 102n1 may provide a report indicating that no SRS was received. Additionally, in some implementations, the base stations 102s and 102n2 may combine location information reports and, e.g., the serving base station 102s may provide a single location information report to the location server 1002. Alternatively, the base stations 102s and 102n2 may provide their location information reports to the UE 104 which may generate a position determination using the location information reports. The UE 104 may provide the position determination and/or the position measurements to the location server 1002.

At stage 13, the location server 1002 may determine the UE location based on the positioning measurements provided in the location information received from the UE 104 and the base stations 102 at stage 12.

Figure 11:
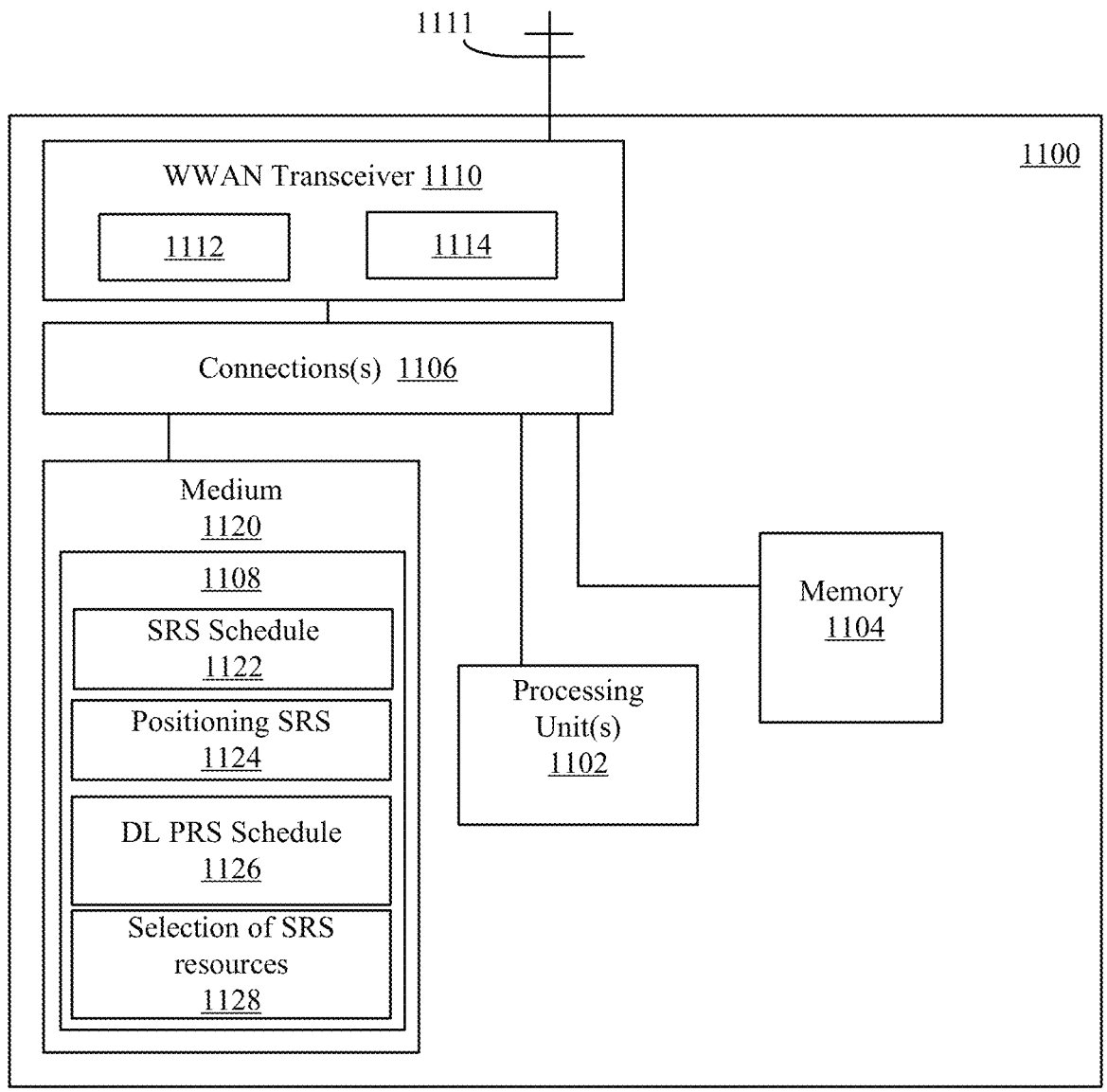
FIG. 11 shows a schematic block diagram illustrating certain exemplary features of a UE enabled to support scheduling of SRS for the UE with multiple reserved occasions for transmitting positioning SRS.

FIG. 11 shows a schematic block diagram illustrating certain exemplary features of a UE 1100, e.g., which may be UE 104 shown in FIG. 1, enabled to support scheduling of SRS for the UE with multiple reserved occasions for transmitting positioning SRS, according to the disclosure herein. The UE 1100 may be configured to perform the signaling flow 1000 of FIG. 11 and the process 1300 of FIG. 13, and associated algorithms discussed herein. UE 1100 may, for example, include one or more processors 1102, memory 1104, an external interface such as a wireless transceiver 1110 (e.g., wireless network interface), which may be operatively coupled with one or more connections 1106 (e.g., buses, lines, fibers, links, etc.) to non-transitory computer readable medium 1120 and memory 1104. The UE 1100 may include additional items, which are not shown, such as a user interface that may include e.g., a display, a keypad or other input device, such as virtual keypad on the display, through which a user may interface with the UE, or a satellite positioning system receiver. In certain example implementations, all or part of UE 1100 may take the form of a chipset, and/or the like. Wireless transceiver 1110 may, for example, include a transmitter 1112 enabled to transmit one or more signals over one or more types of wireless communication networks and a receiver 1114 to receive one or more signals transmitted over the one or more types of wireless communication networks.

In some embodiments, UE 1100 may include antenna 1111, which may be internal or external. UE antenna 1111 may be used to transmit and/or receive signals processed by wireless transceiver 1110. In some embodiments, UE antenna 1111 may be coupled to wireless transceiver 1110. In some embodiments, measurements of signals received (transmitted) by UE 1100 may be performed at the point of connection of the UE antenna 1111 and wireless transceiver 1110. For example, the measurement point of reference for received (transmitted) RF signal measurements may be an input (output) terminal of the receiver 1114 (transmitter 1112) and an output (input) terminal of the UE antenna 1111. In a UE 1100 with multiple UE antennas 1111 or antenna arrays, the antenna connector may be viewed as a virtual point representing the aggregate output (input) of multiple UE antennas. UE 1100 may receive signals, e.g., for scheduling SRS resources with multiple reserved occasions and for transmitting positioning SRS on a first available reserved occasion.

The one or more processors 1102 may be implemented using a combination of hardware, firmware, and software. For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of UE 1100. The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. The medium 1120 and/or memory 1104 may include one or more components or modules that may be implemented by the one or more processors 1102 to perform the methodologies described herein. While the components or modules are illustrated as program code 1108 in medium 1120 that is executable by the one or more processors 1102, it should be understood that the components or modules may be stored in memory 1104 or may be dedicated hardware either in the one or more processors 1102 or off the processors.

A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in UE 1100 is merely exemplary, and as such the functionality of the modules and/or data structures may be combined, separated, and/or be structured in different ways depending upon the implementation of the UE 1100.

The medium 1120 and/or memory 1104 may include an SRS schedule module 1122 that when implemented by the one or more processors 1102 configures the one or more processors 1102 to receive from a serving base station, via transceiver 1110, an SRS schedule for transmitting a positioning SRS, and which may include multiple reserved occasions for transmitting the positioning SRS, e.g., as discussed in FIGS. 6-10. In some implementations, the SRS schedule may be in relation to a DL PRS schedule received by the UE 1100, e.g., with a reserved occasion being scheduled for a predetermined time after a PRS occasion.

The medium 1120 and/or memory 1104 may include a positioning SRS module 1124 that when implemented by the one or more processors 1102 configures the one or more processors 1102 to transmit, via transceiver 1110, the positioning SRS on a reserved occasion that is first available for transmission of the positioning SRS, e.g., as discussed in FIGS. 6-10.

The medium 1120 and/or memory 1104 may include a DL PRS schedule module 1126 that when implemented by the one or more processors 1102 configures the one or more processors 1102 to receive from the serving base station, via transceiver 1110, a DL PRS schedule, e.g., as discussed in reference to FIGS. 6-9 and at stage 4b in FIG. 10. The SRS schedule, for example, is in relation to the DL PRS schedule. The first reserved occasion of the multiple reserved occasions, for example, may be scheduled for a predetermined time after a PRS occasion.

The medium 1120 and/or memory 1104 may include a selection of SRS resources module 1128 that when implemented by the one or more processors 1102 configures the one or more processors 1102 to receive from the serving base station, via transceiver 1110, a selection of a subset of SRS resources that are configured with multiple reserved occasions in a message that is separate from the SRS schedule, e.g., as discussed in FIGS. 6-10. For example, a selection of the subset of the plurality of SRS resources may be based on a positioning method used with the positioning SRS, e.g., as discussed in reference to FIGS. 6-9 and at stage 9 in FIG. 10.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support positioning of the UE, in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a wireless transceiver 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

Figure 12:
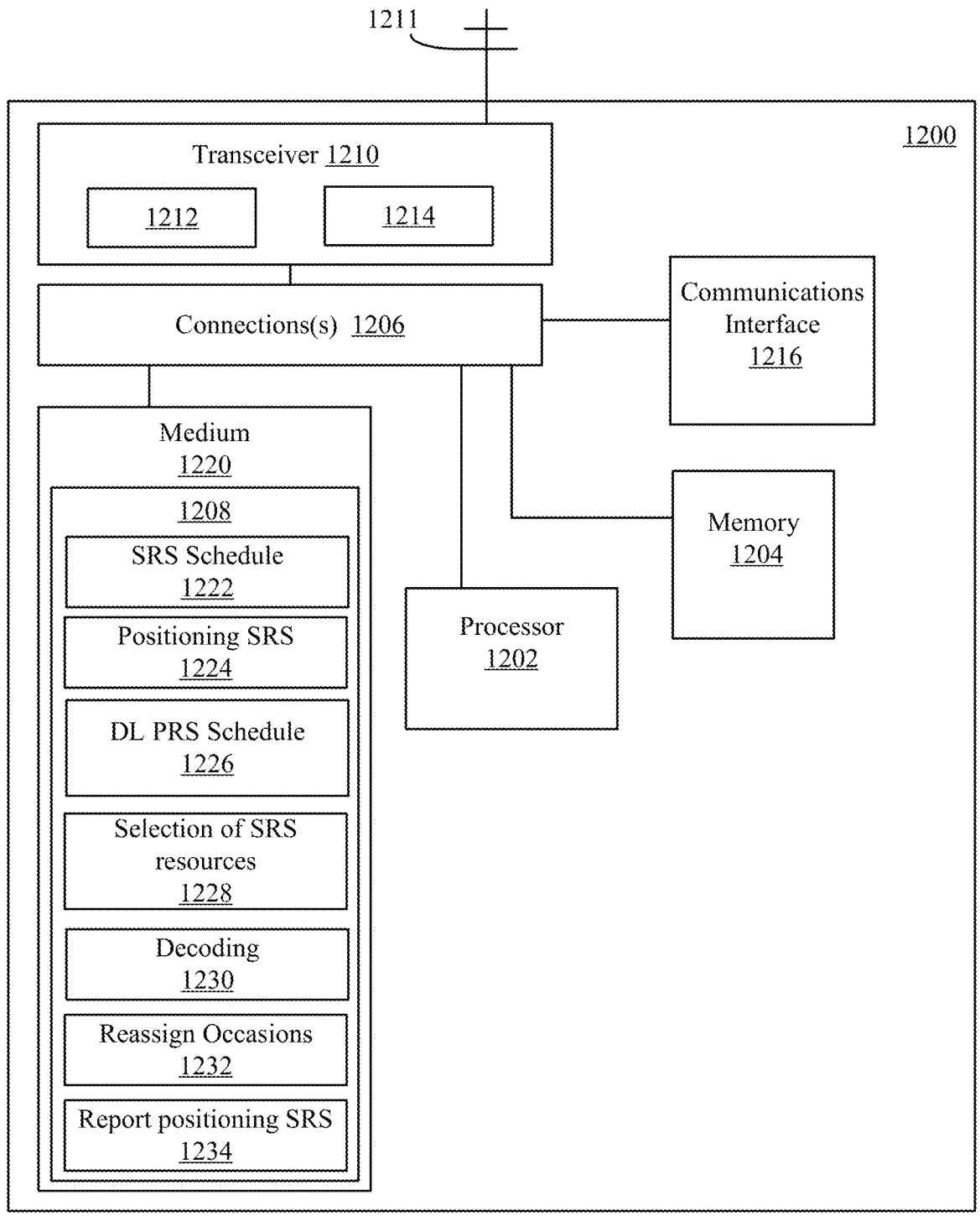
FIG. 12 shows a schematic block diagram illustrating certain exemplary features of a base station in a wireless network enabled to support scheduling of SRS for the UE with multiple reserved occasions for transmitting positioning SRS.

FIG. 12 shows a schematic block diagram illustrating certain exemplary features of a base station 1200 in a wireless network enabled to support scheduling of SRS for the UE with multiple reserved occasions for transmitting positioning SRS, according to the disclosure herein, according to the disclosure herein. The base station 1200, for example, may be an eNB or gNB. The base station 1200 may be configured to perform the signaling flow 1000 of FIG. 11 and the process 1400 of FIG. 14, and associated algorithms discussed herein. The base station 1200 may, for example, include one or more processors 1202, memory 1204, and an external interface, which may include a wireless transceiver 1210 (e.g., wireless network interface), and a communications interface 1216 (e.g., wireline or wireless network interface to other network entities and/or the core network), which may be operatively coupled with one or more connections 1206 (e.g., buses, lines, fibers, links, etc.) to non-transitory computer readable medium 1220 and memory 1204. In some implementations, the base station 1200 may further include additional items, which are not shown. In certain example implementations, all or part of base station 1200 may take the form of a chipset, and/or the like. Wireless transceiver 1210, if present, may, for example, include a transmitter 1212 enabled to transmit one or more signals over one or more types of wireless communication networks and a receiver 1214 to receive one or more signals transmitted over the one or more types of wireless communication networks. The communications interface 1216 may be a wired or wireless interface capable of connecting to other base stations, e.g., in the RAN or network entities, such as a location server 172 shown in FIG. 1.

In some embodiments, base station 1200 may include antenna 1211, which may be internal or external. Antenna 1211 may be used to transmit and/or receive signals processed by wireless transceiver 1210. In some embodiments, antenna 1211 may be coupled to wireless transceiver 1210. In some embodiments, measurements of signals received (transmitted) by base station 1200 may be performed at the point of connection of the antenna 1211 and wireless transceiver 1210. For example, the measurement point of reference for received (transmitted) RF signal measurements may be an input (output) terminal of the receiver 1214 (transmitter 1212) and an output (input) terminal of the antenna 1211. In a base station 1200 with multiple antennas 1211 or antenna arrays, the antenna connector may be viewed as a virtual point representing the aggregate output (input) of multiple antennas. In some embodiments, base station 1200 may transmit signals, e.g., for scheduling SRS resources at the UE with multiple reserved occasions and for receiving and generating positioning measurements from positioning SRS received on a first available reserved occasion, and for reassigning unused reserved occasions and reporting positioning measurements with associated time stamps for the reserved occasion in which the positioning SRS is received.

The one or more processors 1202 may be implemented using a combination of hardware, firmware, and software.

For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of base station 1200. The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. The medium 1220 and/or memory 1204 may include one or more components or modules that may be implemented by the one or more processors 1202 to perform the methodologies described herein. While the components or modules are illustrated as program code in medium 1220 that is executable by the one or more processors 1202, it should be understood that the components or modules may be stored in memory 1204 or may be dedicated hardware either in the one or more processors 1202 or off the processors.

A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in base station 1200 is merely exemplary, and as such the functionality of the modules and/or data structures may be combined, separated, and/or be structured in different ways depending upon the implementation of the base station 1200.

The medium 1220 and/or memory 1204 may include an SRS schedule module 1222 that when implemented by the one or more processors 1202 configures the one or more processors 1202 to transmit to a UE, via transceiver 1210, an SRS schedule for transmitting a positioning SRS, and which may include multiple reserved occasions for transmitting the positioning SRS, e.g., as discussed in FIGS. 6-10. In some implementations, the SRS schedule may be in relation to a DL PRS schedule received by the base station 1200, e.g., with a reserved occasion being scheduled for a predetermined time after a PRS occasion.

The medium 1220 and/or memory 1204 may include a positioning SRS module 1224 that when implemented by the one or more processors 1202 configures the one or more processors 1202 to receive, via transceiver 1210, the positioning SRS on a reserved occasion and to stop processing for the position SRS on any subsequent reserved occasions, e.g., as discussed in FIGS. 6-10.

The medium 1220 and/or memory 1204 may include a DL PRS schedule module 1226 that when implemented by the one or more processors 1202 configures the one or more processors 1202 to transmit, via transceiver 1210, a DL PRS schedule, where the SRS schedule is in relation to the DL PRS schedule, e.g., as discussed in reference to FIGS. 6-9 and at stage 4b in FIG. 10. For example, a first reserved occasion of the multiple reserved occasions may be scheduled for a predetermined time after a PRS occasion, e.g., as discussed in reference to FIGS. 6-9 and at stage 4b in FIG. 10.

The medium 1220 and/or memory 1204 may include a selection of SRS resources module 1228 that when implemented by the one or more processors 1202 configures the one or more processors 1202 to transmit to the UE, via transceiver 1210, a selection of a subset of SRS resources that are configured with multiple reserved occasions, e.g., as discussed in FIGS. 6-10. The selection of the subset of SRS resources may be transmitted in a message that is separate from the SRS schedule, e.g., as discussed in reference to FIGS. 6-9 and at stage 9 in FIG. 10. For example, the selection of the subset of the plurality of SRS resources may be based on a positioning method used with the positioning SRS, e.g., as discussed in reference to FIGS. 6-9 and at stage 9 in FIG. 10.

The medium 1220 and/or memory 1204 may include a decoding module 1230 that when implemented by the one or more processors 1202 configures the one or more processors 1202 to decode the positioning SRS on each reserved occasion until the positioning SRS is received on the reserved occasion, e.g., as discussed in reference to FIGS. 6-9 and at stages 7a and 7b in FIG. 10.

The medium 1220 and/or memory 1204 may include a reassign occasions module 1232 that when implemented by the one or more processors 1202 configures the one or more processors 1202 to reassign any subsequent reserved occasions to one or more of different UEs or different channels transmit to the UE once the positioning SRS is received, e.g., as discussed in FIGS. 6-10.

The medium 1220 and/or memory 1204 may include a report positioning SRS module 1234 that when implemented by the one or more processors 1202 configures the one or more processors 1202 to report to a location server, via communications interface a positioning SRS measurement and an associated time stamp for the reserved occasion at which the positioning SRS is received, e.g., as discussed in FIGS. 6-10.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program 1208. For example, the non-transitory computer readable medium including program code 1208 stored thereon may include program code 1208 to support positioning of a UE, in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include a wireless transceiver 1210 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable code 1208 stored thereon, which if executed by one or more processors 1202 may be operatively enabled to perform all or portions of the example operations as described herein. Computer readable medium 1220 may be a part of memory 1204.

Figure 13:
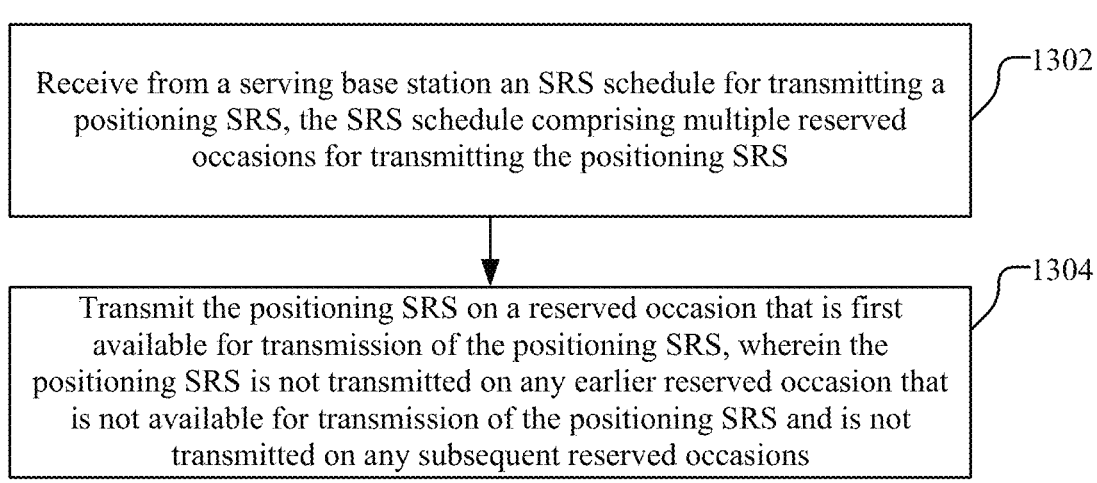
FIG. 13 shows a flowchart for an exemplary method for supporting scheduling of SRS for a UE performed by the UE in a wireless network.

FIG. 13 shows a flowchart for an exemplary method 1300 for supporting scheduling of SRS for a UE, such as UE 104, performed by the UE in a wireless network.

At block 1302, the UE receives from a serving base station an SRS schedule for transmitting a positioning SRS, the SRS schedule comprising multiple reserved occasions for transmitting the positioning SRS, e.g., as discussed in reference to FIGS. 6-9 and at stage 4b in FIG. 10. A means for receiving from a serving base station an SRS schedule for transmitting a positioning SRS, the SRS schedule comprising multiple reserved occasions for transmitting the positioning SRS may be, e.g., the wireless transceiver 1110 and one or more processors 1102 with dedicated hardware or implementing executable code or software instructions in memory 1104 and/or medium 1120 such as the SRS schedule module 1122 in UE 1100 shown in FIG. 11.

At block 1304, the UE transmits the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions, e.g., as discussed in reference to FIGS. 6-9 and at stage 7b in FIG. 10. A means for transmitting the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions may be, e.g., the wireless transceiver 1110 and one or more processors 1102 with dedicated hardware or implementing executable code or software instructions in memory 1104 and/or medium 1120 such as the positioning SRS module 1124 in UE 1100 shown in FIG. 11.

The UE may further receive a downlink (DL) Positioning Reference Signal (PRS) schedule, wherein the SRS schedule is in relation to the DL PRS schedule, e.g., as discussed in reference to FIGS. 6-9 and at stage 4b in FIG. 10. A means for receiving a downlink (DL) Positioning Reference Signal (PRS) schedule, wherein the SRS schedule is in relation to the DL PRS schedule may be, e.g., the wireless transceiver 1110 and one or more processors 1102 with dedicated hardware or implementing executable code or software instructions in memory 1104 and/or medium 1120 such as the DL PRS schedule module 1126 in UE 1100 shown in FIG. 11. In one example, a first reserved occasion of the multiple reserved occasions is scheduled for a predetermined time after a PRS occasion, e.g., as discussed in reference to FIGS. 6-9 and at stage 4b in FIG. 10.

In some implementations, the reserved occasions in the multiple reserved occasions may be scheduled with a known time offset relative to a preceding reserved occasion, e.g., as discussed in reference to FIGS. 6-9 and at stage 4b in FIG. 10. The reserved occasions in the multiple reserved occasions, for example, may use different known time offsets, e.g., as discussed in reference to FIGS. 6-9 and at stage 4b in FIG. 10.

In some implementations, an earlier reserved occasion may not be available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure, e.g., as discussed in reference to FIGS. 6-9 and at stage 7a in FIG. 10.

In some implementations, the SRS schedule may be for a plurality of SRS resources and SRS resources in a subset of the plurality of SRS resources may be configured with multiple reserved occasions for transmitting the positioning SRS, e.g., as discussed in reference to FIGS. 6-9 and at stages 4b and 9 in FIG. 10. For example, the SRS resources in a remaining subset of the plurality of SRS resources may be configured with one SRS occasion and the positioning SRS is not transmitted when there is a collision, e.g., as discussed in reference to FIGS. 6-9 and at stages 4b and 9 in FIG. 10. The UE may receive a selection of the subset of the plurality of SRS resources from the serving base station in a message that is separate from the SRS schedule, e.g., as discussed in reference to FIGS. 6-9 and at stage 9 in FIG. 10. A means for receiving a selection of the subset of the plurality of SRS resources from the serving base station in a message that is separate from the SRS schedule may be, e.g., the wireless transceiver 1110 and one or more processors 1102 with dedicated hardware or implementing executable code or software instructions in memory 1104 and/or medium 1120 such as the selection of SRS resources module 1128 in UE 1100 shown in FIG. 11. In one example, a selection of the subset of the plurality of SRS resources is based on a positioning method used with the positioning SRS, e.g., as discussed in reference to FIGS. 6-9 and at stage 9 in FIG. 10.

Figure 14:
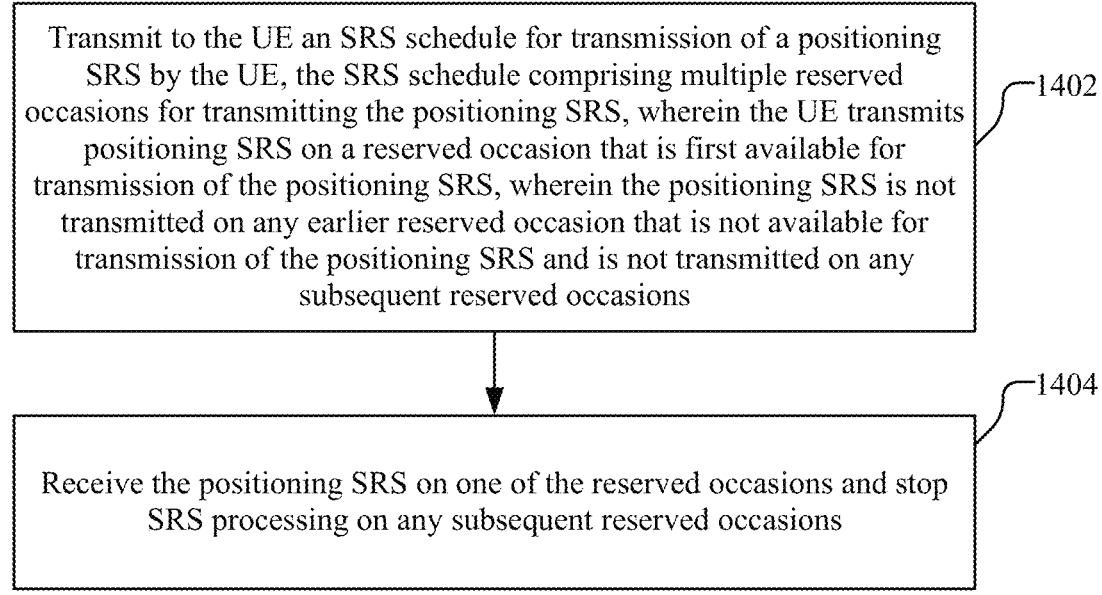
FIG. 14 shows a flowchart for an exemplary method for supporting scheduling of SRS for a UE performed by a base station in a wireless network.

FIG. 14 shows a flowchart for an exemplary method 1400 for supporting scheduling of SRS for a UE, such as UE 104, performed by a base station, such as base station 102, in a wireless network.

At block 1402, the base station transmits to the UE an SRS schedule for transmission of a positioning SRS by the UE, the SRS schedule comprising multiple reserved occasions for transmitting the positioning SRS, wherein the UE transmits positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions, e.g., as discussed in reference to FIGS. 6-9 and at stage 4b in FIG. 10. A means for transmitting to the UE an SRS schedule for transmission of a positioning SRS by the UE, the SRS schedule comprising multiple reserved occasions for transmitting the positioning SRS, wherein the UE transmits positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions may be, e.g., the wireless transceiver 1210 and one or more processors 1202 with dedicated hardware or implementing executable code or software instructions in memory 1204 and/or medium 1220 such as the SRS schedule module 1222 in base station 1200 shown in FIG. 12.

At block 1404, the base station may receive the positioning SRS on one of the reserved occasions and stop SRS processing on any subsequent reserved occasions, e.g., as discussed in reference to FIGS. 6-9 and at stage 7b in FIG. 10. A means for receiving the positioning SRS on one of the reserved occasions and stop SRS processing on any subsequent reserved occasions may be, e.g., the wireless transceiver 1210 and one or more processors 1202 with dedicated hardware or implementing executable code or software instructions in memory 1204 and/or medium 1220 such as the positioning SRS module 1224 in base station 1200 shown in FIG. 12.

The base station may further transmit a downlink (DL) Positioning Reference Signal (PRS) schedule, wherein the SRS schedule is in relation to the DL PRS schedule, e.g., as discussed in reference to FIGS. 6-9 and at stage 4b in FIG. 10. A means for transmitting a downlink (DL) Positioning Reference Signal (PRS) schedule, wherein the SRS schedule is in relation to the DL PRS schedule may be, e.g., the wireless transceiver 1210 and one or more processors 1202 with dedicated hardware or implementing executable code or software instructions in memory 1204 and/or medium 1220 such as the DL PRS schedule module 1226 in base station in base station 1200 shown in FIG. 12. In one example, a first reserved occasion of the multiple reserved occasions is scheduled for a predetermined time after a PRS occasion, e.g., as discussed in reference to FIGS. 6-9 and at stage 4b in FIG. 10.

In some implementations, the reserved occasions in the multiple reserved occasions may be scheduled with a known time offset relative to a preceding reserved occasion, e.g., as discussed in reference to FIGS. 6-9 and at stage 4b in FIG. 10. The reserved occasions in the multiple reserved occasions, for example, may use different known time offsets, e.g., as discussed in reference to FIGS. 6-9 and at stage 4b in FIG. 10.

In some implementations, an earlier reserved occasion may not be available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure, e.g., as discussed in reference to FIGS. 6-9 and at stage 7a in FIG. 10.

In some implementations, the SRS schedule may be for a plurality of SRS resources and SRS resources in a subset of the plurality of SRS resources may be configured with multiple reserved occasions for transmitting the positioning SRS, e.g., as discussed in reference to FIGS. 6-9 and at stages 4b and 9 in FIG. 10. For example, the SRS resources in a remaining subset of the plurality of SRS resources are configured with one SRS occasion and the UE does not transmit the positioning SRS when there is a collision, e.g., as discussed in reference to FIGS. 6-9 and at stages 4b and 9 in FIG. 10. The base station may transmit a selection of the subset of the plurality of SRS resources from the serving base station in a message that is separate from the SRS schedule, e.g., as discussed in reference to FIGS. 6-9 and at stage 9 in FIG. 10. A means for transmitting a selection of the subset of the plurality of SRS resources from the serving base station in a message that is separate from the SRS schedule may be, e.g., the wireless transceiver 1210 and one or more processors 1202 with dedicated hardware or implementing executable code or software instructions in memory 1204 and/or medium 1220 such as the selection of SRS resources module 1228 in base station 1200 shown in FIG. 12. In one example, a selection of the subset of the plurality of SRS resources may be based on a positioning method used with the positioning SRS, e.g., as discussed in reference to FIGS. 6-9 and at stage 9 in FIG. 10.

In one implementation, the base station may receive the positioning SRS on the one of the reserved occasions by decoding the positioning SRS on each reserved occasion until the positioning SRS is received on the one of the reserved occasions, e.g., as discussed in reference to FIGS. 6-9 and at stages 7a and 7b in FIG. 10. A means for decoding the positioning SRS on each reserved occasion until the positioning SRS is received on the one of the reserved occasions may be, e.g., the wireless transceiver 1210 and one or more processors 1202 with dedicated hardware or implementing executable code or software instructions in memory 1204 and/or medium 1220 such as the decoding module 1230 in base station 1200 shown in FIG. 12.

In one implementation, the base station may reassign any subsequent reserved occasions to one or more of different UEs or different channels, e.g., as discussed in reference to FIGS. 6-9 and at stage 7b in FIG. 10. A means for reassigning the any subsequent reserved occasions to one or more of different UEs or different channels may be, e.g., the wireless transceiver 1210 and one or more processors 1202 with dedicated hardware or implementing executable code or software instructions in memory 1204 and/or medium 1220 such as the reassign occasions module 1232 in base station 1200 shown in FIG. 12.

In one implementation, the base station may report to a location server a positioning SRS measurement and an associated time stamp for the reserved occasion at which the positioning SRS is received, e.g., as discussed in reference to FIGS. 6-9 and at stage 12 in FIG. 10. A means for reporting to a location server a positioning SRS measurement and an associated time stamp for the reserved occasion at which the positioning SRS is received may be, e.g., the wireless transceiver 1210 and one or more processors 1202 with dedicated hardware or implementing executable code or software instructions in memory 1204 and/or medium 1220 such as the report positioning SRS module 1234 in base station 1200 shown in FIG. 12.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilising terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description, embodiments may include different combinations of features. Implementation examples are described in the following numbered clauses:

Clause 1. A method for supporting scheduling of Sounding Reference Signals (SRS) for a user equipment (UE) performed by the UE in a wireless network, comprising: receiving from a serving base station an SRS schedule for transmitting a positioning SRS, the SRS schedule comprising multiple reserved occasions for transmitting the positioning SRS; and transmitting the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions.

Clause 2. The method of clause 1, further comprising receiving a downlink (DL) Positioning Reference Signal (PRS) schedule, wherein the SRS schedule is in relation to the DL PRS schedule.

Clause 3. The method of clause 2, wherein a first reserved occasion of the multiple reserved occasions is scheduled for a predetermined time after a PRS occasion.

Clause 4. The method of any of clauses 1-3, wherein reserved occasions in the multiple reserved occasions are scheduled with a known time offset relative to a preceding reserved occasion.

Clause 5. The method of clause 4, wherein the reserved occasions in the multiple reserved occasions use different known time offsets.

Clause 6. The method of any of clauses 1-5, wherein an earlier reserved occasion is not available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure.

Clause 7. The method of any of clauses 1-6, wherein the SRS schedule is for a plurality of SRS resources and SRS resources in a subset of the plurality of SRS resources are configured with multiple reserved occasions for transmitting the positioning SRS.

Clause 8. The method of clause 7, wherein SRS resources in a remaining subset of the plurality of SRS resources are configured with one SRS occasion and the positioning SRS is not transmitted when there is a collision.

Clause 9. The method of clause 7, further comprising receiving a selection of the subset of the plurality of SRS resources from the serving base station in a message that is separate from the SRS schedule.

Clause 10. The method of clause 7, wherein a selection of the subset of the plurality of SRS resources is based on a positioning method used with the positioning SRS.

Clause 11. A user equipment (UE) configured to support scheduling of Sounding Reference Signals (SRS) in a wireless network, comprising: a wireless transceiver configured to wirelessly communicate with a serving base station in the wireless network; at least one memory; at least one processor coupled to the wireless transceiver and the at least one memory, wherein the at least one processor is configured to: receive from the serving base station an SRS schedule for transmitting a positioning SRS, the SRS schedule comprising multiple reserved occasions for transmitting the positioning SRS; and transmit the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions.

Clause 12. The UE of clause 11, wherein the at least one processor is further configured to receive a downlink (DL) Positioning Reference Signal (PRS) schedule, wherein the SRS schedule is in relation to the DL PRS schedule.

Clause 13. The UE of clause 12, wherein a first reserved occasion of the multiple reserved occasions is scheduled for a predetermined time after a PRS occasion.

Clause 14. The UE of any of clauses 11-13, wherein reserved occasions in the multiple reserved occasions are scheduled with a known time offset relative to a preceding reserved occasion.

Clause 15. The UE of clause 14, wherein the reserved occasions in the multiple reserved occasions use different known time offsets.

Clause 16. The UE of any of clauses 11-15, wherein an earlier reserved occasion is not available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure.

Clause 17. The UE of any of clauses 11-16, wherein the SRS schedule is for a plurality of SRS resources and SRS resources in a subset of the plurality of SRS resources are configured with multiple reserved occasions for transmitting the positioning SRS.

Clause 18. The UE of clause 17, wherein SRS resources in a remaining subset of the plurality of SRS resources are configured with one SRS occasion and the positioning SRS is not transmitted when there is a collision.

Clause 19. The UE of clause 17, wherein the at least one processor is further configured to receive a selection of the subset of the plurality of SRS resources from the serving base station in a message that is separate from the SRS schedule.

Clause 20. The UE of clause 17, wherein a selection of the subset of the plurality of SRS resources is based on a positioning method used with the positioning SRS.

Clause 21. A user equipment (UE) configured to support scheduling of Sounding Reference Signals (SRS) in a wireless network, comprising: means for receiving from a serving base station an SRS schedule for transmitting a positioning SRS, the SRS schedule comprising multiple reserved occasions for transmitting the positioning SRS; and means for transmitting the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions.

Clause 22. The UE of clause 21, further comprising means for receiving a downlink (DL) Positioning Reference Signal (PRS) schedule, wherein the SRS schedule is in relation to the DL PRS schedule.

Clause 23. The UE of clause 22, wherein a first reserved occasion of the multiple reserved occasions is scheduled for a predetermined time after a PRS occasion.

Clause 24. The UE of any of clauses 21-23, wherein reserved occasions in the multiple reserved occasions are scheduled with a known time offset relative to a preceding reserved occasion.

Clause 25. The UE of clause 24, wherein the reserved occasions in the multiple reserved occasions use different known time offsets.

Clause 26. The UE of any of clauses 21-25, wherein an earlier reserved occasion is not available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure.

Clause 27. The UE of any of clauses 21-26, wherein the SRS schedule is for a plurality of SRS resources and SRS resources in a subset of the plurality of SRS resources are configured with multiple reserved occasions for transmitting the positioning SRS.

Clause 28. The UE of clause 27, wherein SRS resources in a remaining subset of the plurality of SRS resources are configured with one SRS occasion and the positioning SRS is not transmitted when there is a collision.

Clause 29. The UE of clause 27, further comprising means for receiving a selection of the subset of the plurality of SRS resources from the serving base station in a message that is separate from the SRS schedule.

Clause 30. The UE of clause 27, wherein a selection of the subset of the plurality of SRS resources is based on a positioning method used with the positioning SRS.

Clause 31. A non-transitory computer readable storage medium including program code stored thereon, the program code is operable to configure at least one processor in a user equipment (UE) configured to support scheduling of Sounding Reference Signals (SRS) in a wireless network, comprising: program code to receive from a serving base station an SRS schedule for transmitting a positioning SRS, the SRS schedule comprising multiple reserved occasions for transmitting the positioning SRS; and program code to transmit the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions.

Clause 32. A method for supporting scheduling of Sounding Reference Signals (SRS) for a user equipment (UE) performed by a base station in a wireless network, comprising: transmitting to the UE an SRS schedule for transmission of a positioning SRS by the UE, the SRS schedule comprising multiple reserved occasions for transmitting the positioning SRS, wherein the UE transmits the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions; and receiving the positioning SRS on one of the reserved occasions and stop SRS processing on any subsequent reserved occasions.

Clause 33. The method of clause 32, further comprising transmitting a downlink (DL) Positioning Reference Signal (PRS) schedule, wherein the SRS schedule is in relation to the DL PRS schedule.

Clause 34. The method of clause 33, wherein a first reserved occasion of the multiple reserved occasions is scheduled for a predetermined time after a PRS occasion.

Clause 35. The method of any of clauses 32-34, wherein reserved occasions in the multiple reserved occasions are scheduled with a known time offset relative to a preceding reserved occasion.

Clause 36. The method of clause 35, wherein the reserved occasions in the multiple reserved occasions use different known time offsets.

Clause 37. The method of any of clauses 32-36, wherein an earlier reserved occasion is not available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure.

Clause 38. The method of any of clauses 32-37, wherein the SRS schedule is for a plurality of SRS resources and SRS resources in a subset of the plurality of SRS resources are configured with multiple reserved occasions for transmitting the positioning SRS.

Clause 39. The method of clause 38, wherein SRS resources in a remaining subset of the plurality of SRS resources are configured with one SRS occasion and the UE does not transmit the positioning SRS when there is a collision.

Clause 40. The method of clause 38, further comprising transmitting a selection of the subset of the plurality of SRS resources to the UE in a message that is separate from the SRS schedule.

Clause 41. The method of clause 38, wherein a selection of the subset of the plurality of SRS resources is based on a positioning method used with the positioning SRS.

Clause 42. The method of any of clauses 32-41, wherein receiving the positioning SRS on the one of the reserved occasions comprises decoding the positioning SRS on each reserved occasion until the positioning SRS is received on the one of the reserved occasions.

Clause 43. The method of any of clauses 32-42, further comprising reassigning the any subsequent reserved occasions to one or more of different UEs or different channels.

Clause 44. The method of any of clauses 32-43, further comprising reporting to a location server a positioning SRS measurement and an associated time stamp for the reserved occasion at which the positioning SRS is received.

Clause 45. A base station configured to support scheduling of Sounding Reference Signals (SRS) for a user equipment (UE) in a wireless network, comprising: an external interface configured to wirelessly communicate with the UE in the wireless network; at least one memory; at least one processor coupled to the external interface and the at least one memory, wherein the at least one processor is configured to: transmit to the UE an SRS schedule for transmission of a positioning SRS by the UE, the SRS schedule comprising multiple reserved occasions for transmitting the positioning SRS, wherein the UE transmits the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions; and receive the positioning SRS on one of the reserved occasions and stop SRS processing on any subsequent reserved occasions.

Clause 46. The base station of clause 45, wherein the at least one processor is further configured to transmit a downlink (DL) Positioning Reference Signal (PRS) schedule, wherein the SRS schedule is in relation to the DL PRS schedule.

Clause 47. The base station of clause 46, wherein a first reserved occasion of the multiple reserved occasions is scheduled for a predetermined time after a PRS occasion.

Clause 48. The base station of any of clauses 45-47, wherein reserved occasions in the multiple reserved occasions are scheduled with a known time offset relative to a preceding reserved occasion.

Clause 49. The base station of clause 48, wherein the reserved occasions in the multiple reserved occasions use different known time offsets.

Clause 50. The base station of any of clauses 45-49, wherein an earlier reserved occasion is not available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure.

Clause 51. The base station of any of clauses 45-50, wherein the SRS schedule is for a plurality of SRS resources and SRS resources in a subset of the plurality of SRS resources are configured with multiple reserved occasions for transmitting the positioning SRS.

Clause 52. The base station of clause 51, wherein SRS resources in a remaining subset of the plurality of SRS resources are configured with one SRS occasion and the UE does not transmit the positioning SRS when there is a collision.

Clause 53. The base station of clause 51, wherein the at least one processor is further configured to transmit a selection of the subset of the plurality of SRS resources to the UE in a message that is separate from the SRS schedule.

Clause 54. The base station of clause 51, wherein a selection of the subset of the plurality of SRS resources is based on a positioning method used with the positioning SRS.

Clause 55. The base station of any of clauses 45-54, wherein the at least one processor is configured to receive the positioning SRS on the one of the reserved occasions by being configured to decode the positioning SRS on each reserved occasion until the positioning SRS is received on the one of the reserved occasions.

Clause 56. The base station of any of clauses 45-55, wherein the at least one processor is further configured to reassign the any subsequent reserved occasions to one or more of different UEs or different channels.

Clause 57. The base station of any of clauses 45-56, wherein the at least one processor is further configured to report to a location server a positioning SRS measurement and an associated time stamp for the reserved occasion at which the positioning SRS is received.

Clause 58. A base station configured to support scheduling of Sounding Reference Signals (SRS) for a user equipment (UE) in a wireless network, comprising: means for transmitting to the UE an SRS schedule for transmission of a positioning SRS by the UE, the SRS schedule comprising multiple reserved occasions for transmitting the positioning SRS, wherein the UE transmits the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions; and means for receiving the positioning SRS on one of the reserved occasions and stop SRS processing on any subsequent reserved occasions.

Clause 59. The base station of clause 58, further comprising means for transmitting a downlink (DL) Positioning Reference Signal (PRS) schedule, wherein the SRS schedule is in relation to the DL PRS schedule.

Clause 60. The base station of clause 59, wherein a first reserved occasion of the multiple reserved occasions is scheduled for a predetermined time after a PRS occasion.

Clause 61. The base station of any of clauses 58-60, wherein reserved occasions in the multiple reserved occasions are scheduled with a known time offset relative to a preceding reserved occasion.

Clause 62. The base station of clause 61, wherein the reserved occasions in the multiple reserved occasions use different known time offsets.

Clause 63. The base station of any of clauses 58-62, wherein an earlier reserved occasion is not available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure.

Clause 64. The base station of any of clauses 58-63, wherein the SRS schedule is for a plurality of SRS resources and SRS resources in a subset of the plurality of SRS resources are configured with multiple reserved occasions for transmitting the positioning SRS.

Clause 65. The base station of clause 64, wherein SRS resources in a remaining subset of the plurality of SRS resources are configured with one SRS occasion and the UE does not transmit the positioning SRS when there is a collision.

Clause 66. The base station of clause 64, further comprising means for transmitting a selection of the subset of the plurality of SRS resources to the UE in a message that is separate from the SRS schedule.

Clause 67. The base station of clause 64, wherein a selection of the subset of the plurality of SRS resources is based on a positioning method used with the positioning SRS.

Clause 68. The base station of any of clauses 58-67, wherein the means for receiving the positioning SRS on the one of the reserved occasions decodes the positioning SRS on each reserved occasion until the positioning SRS is received on the one of the reserved occasions.

Clause 69. The base station of any of clauses 58-68, further comprising means for reassigning the any subsequent reserved occasions to one or more of different UEs or different channels.

Clause 70. The base station of any of clauses 58-69, further comprising means for reporting to a location server a positioning SRS measurement and an associated time stamp for the reserved occasion at which the positioning SRS is received.

Clause 71. A non-transitory computer readable storage medium including program code stored thereon, the program code is operable to configure at least one processor a base station configured to support scheduling of Sounding Reference Signals (SRS) for a user equipment (UE) in a wireless network, comprising: program code to transmit to the UE an SRS schedule for transmission of a positioning SRS by the UE, the SRS schedule comprising multiple reserved occasions for transmitting the positioning SRS, wherein the UE transmits the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions; and program code to receive the positioning SRS on one of the reserved occasions and stop SRS processing on any subsequent reserved occasions.

Therefore, it is intended that claimed subject matter not be limited to the particular examples disclosed, but that such claimed subject matter may also include all aspects falling within the scope of appended claims, and equivalents thereof.

What is claimed is:

1. A method for supporting scheduling of Sounding Reference Signals (SRS) for a user equipment (UE) performed by the UE in a wireless network, comprising:
   receiving from a serving base station an SRS schedule for transmitting a positioning SRS, the SRS schedule comprising multiple reserved occasions for transmitting the positioning SRS; and
   transmitting the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions, and wherein an earlier reserved occasion is not available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure.

2. The method of claim 1, further comprising receiving a downlink (DL) Positioning Reference Signal (PRS) schedule, wherein the SRS schedule is in relation to the DL PRS schedule.

3. The method of claim 1, wherein reserved occasions in the multiple reserved occasions are scheduled with a known time offset relative to a preceding reserved occasion.

4. The method of claim 1, wherein the SRS schedule is for a plurality of SRS resources and SRS resources in a subset of the plurality of SRS resources are configured with multiple reserved occasions for transmitting the positioning SRS.

5. The method of claim 4, wherein SRS resources in a remaining subset of the plurality of SRS resources are configured with one SRS occasion and the positioning SRS is not transmitted when there is a collision.

6. The method of claim 4, further comprising receiving a selection of the subset of the plurality of SRS resources from the serving base station in a message that is separate from the SRS schedule.

7. A user equipment (UE) configured to support scheduling of Sounding Reference Signals (SRS) in a wireless network, comprising:
   a wireless transceiver configured to wirelessly communicate with a serving base station in the wireless network;
   at least one memory;
   at least one processor coupled to the wireless transceiver and the at least one memory, wherein the at least one processor is configured to:
      receive from the serving base station an SRS schedule for transmitting a positioning SRS, the SRS schedule comprising multiple reserved occasions for transmitting the positioning SRS; and
      transmit the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions, and wherein an earlier reserved occasion is not available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure.

8. The UE of claim 7, wherein the at least one processor is further configured to receive a downlink (DL) Positioning Reference Signal (PRS) schedule, wherein the SRS schedule is in relation to the DL PRS schedule.

9. The UE of claim 7, wherein reserved occasions in the multiple reserved occasions are scheduled with a known time offset relative to a preceding reserved occasion.

10. The UE of claim 7, wherein the SRS schedule is for a plurality of SRS resources and SRS resources in a subset of the plurality of SRS resources are configured with multiple reserved occasions for transmitting the positioning SRS.

11. The UE of claim 10, wherein SRS resources in a remaining subset of the plurality of SRS resources are configured with one SRS occasion and the positioning SRS is not transmitted when there is a collision.

12. The UE of claim 10, wherein the at least one processor is further configured to receive a selection of the subset of the plurality of SRS resources from the serving base station in a message that is separate from the SRS schedule.

13. A user equipment (UE) configured to support scheduling of Sounding Reference Signals (SRS) in a wireless network, comprising:
   means for receiving from a serving base station an SRS schedule for transmitting a positioning SRS, the SRS schedule comprising multiple reserved occasions for transmitting the positioning SRS; and
   means for transmitting the positioning SRS on a reserved occasion that is first available for transmission of the positioning SRS, wherein the positioning SRS is not transmitted on any earlier reserved occasion that is not available for transmission of the positioning SRS and is not transmitted on any subsequent reserved occasions, and wherein an earlier reserved occasion is not available for transmission of the positioning SRS due to one or more of a collision with a higher priority uplink (UL) transmission, collision with a higher priority non-positioning SRS, collision with an uplink transmission on another carrier, maximum permissible exposure constraints, and channel access failure.

14. The UE of claim 13, further comprising means for receiving a downlink (DL) Positioning Reference Signal (PRS) schedule, wherein the SRS schedule is in relation to the DL PRS schedule.

15. The UE of claim 13, wherein reserved occasions in the multiple reserved occasions are scheduled with a known time offset relative to a preceding reserved occasion.

16. The UE of claim 13, wherein the SRS schedule is for a plurality of SRS resources and SRS resources in a subset of the plurality of SRS resources are configured with multiple reserved occasions for transmitting the positioning SRS.

17. The UE of claim 16, wherein SRS resources in a remaining subset of the plurality of SRS resources are configured with one SRS occasion and the positioning SRS is not transmitted when there is a collision.

\* \* \* \* \*